(12) United States Patent
Ogasawara et al.

(10) Patent No.: US 9,507,231 B2
(45) Date of Patent: Nov. 29, 2016

(54) DISPLAY DEVICE

(71) Applicant: Sharp Kabushiki Kaisha, Osaka (JP)

(72) Inventors: Isao Ogasawara, Osaka (JP);
Masahiro Yoshida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/851,413

(22) Filed: Sep. 11, 2015

(65) Prior Publication Data
US 2016/0026052 A1 Jan. 28, 2016

Related U.S. Application Data

(63) Continuation of application No. 13/996,698, filed as application No. PCT/JP2011/079633 on Dec. 21, 2011, now Pat. No. 9,164,334.

(30) Foreign Application Priority Data

Dec. 27, 2010 (JP) .................. 2010-291181

(51) Int. Cl.
*G02F 1/1345* (2006.01)
*G02F 1/1362* (2006.01)
*G02F 1/1343* (2006.01)

(52) U.S. Cl.
CPC ....... *G02F 1/136286* (2013.01); *G02F 1/1345* (2013.01); *G02F 1/13439* (2013.01); *G02F 1/13458* (2013.01); *G02F 2001/13456* (2013.01)

(58) Field of Classification Search
CPC ........... G02F 1/136286; G02F 1/1345; G02F 1/13454; G02F 1/13439; G02F 1/13458; G02F 1/13452

USPC .................................. 349/149–152; 345/206
See application file for complete search history.

(56) References Cited

U.S. PATENT DOCUMENTS

| 6,937,313 | B2 | 8/2005 | Park et al. | |
|---|---|---|---|---|
| 7,034,813 | B2 * | 4/2006 | Ishiyama | G02F 1/1345 345/205 |
| 7,609,354 | B2 | 10/2009 | Konno et al. | |

(Continued)

FOREIGN PATENT DOCUMENTS

| JP | 8-179340 A | 7/1996 |
|---|---|---|
| JP | 2001-7272 A | 1/2001 |

(Continued)

*Primary Examiner* — James Dudek
(74) *Attorney, Agent, or Firm* — Chen Yoshimura LLP

(57) ABSTRACT

Provided are a display device and a method of manufacturing same, whereby deterioration in image display quality due to display unevenness or shadowing is avoided. An open region is disposed in a source driver mounting region in a position thereof that corresponds to a remaining output region 15 of a source driver 4. Next, a common signal line 30, which connects an FPC connecting region 19 to a common transfer electrode 20*a*, is formed passing through the open region. It is thus possible to shorten the length of the common signal line 30, and to position the common transfer electrode 20*a* in a desired location. Consequently, variation in the common signal lag for each position on a common electrode is mitigated, making it possible to minimize image display unevenness. The width of the open region is also increased, allowing the width of the common signal line 30 to also be increased. Consequently, the load on the common signal line 30 can be reduced.

8 Claims, 18 Drawing Sheets

(56) References Cited

U.S. PATENT DOCUMENTS

| | | |
|---|---|---|
| 7,839,479 B2 | 11/2010 | Choi |
| 7,894,033 B2 | 2/2011 | Matsuura |
| 2001/0055010 A1 | 12/2001 | Kaise et al. |
| 2002/0145696 A1* | 10/2002 | Kim .................. G02F 1/13452 349/149 |
| 2002/0145697 A1 | 10/2002 | Hoshina |
| 2002/0191140 A1* | 12/2002 | Eguchi ................ G02F 1/1309 349/149 |
| 2003/0227593 A1* | 12/2003 | Miki .................. G02F 1/13452 349/151 |
| 2004/0150781 A1 | 8/2004 | Lim |
| 2005/0195356 A1 | 9/2005 | Aruga et al. |
| 2007/0109485 A1 | 5/2007 | Eguchi et al. |
| 2009/0268147 A1 | 10/2009 | Tang et al. |

FOREIGN PATENT DOCUMENTS

| | | |
|---|---|---|
| JP | 2002-6331 A | 1/2002 |
| JP | 2002-353273 A | 12/2002 |
| JP | 2005-24681 A | 1/2005 |
| JP | 2005-283831 A | 10/2005 |

* cited by examiner

DISPLAY DEVICE

TECHNICAL FIELD

The present invention relates to a display device and a method for manufacturing the same, and particularly, to an active matrix liquid crystal display device having wiring lines for supplying a common signal to common transfer electrodes, and a method for manufacturing the same.

BACKGROUND ART

A liquid crystal display device includes a substrate (hereinafter referred to as a "TFT substrate") on which a plurality of pixels each including a switching element constituted of a thin film transistor (hereinafter referred to as a "TFT") are formed, an opposite substrate disposed opposite to the TFT substrate, and a liquid crystal layer interposed between these substrates. Liquid crystal display devices display images by controlling the light transmittance through liquid crystal by applying a voltage corresponding to an image signal (hereinafter referred to as a "signal voltage") to a pixel electrode formed for each pixel, and applying a common voltage (also referred to as a "common signal") to a common electrode formed on the opposite substrate.

The common signal is supplied from an external source to common transfer electrodes on the TFT substrate through wiring lines (hereinafter referred to as "common signal lines") formed on the TFT substrate. The common transfer electrodes are electrically connected to the common electrode on the opposite substrate, and thus, the common signal is further supplied to the common electrode.

However, because the common electrode is made of a transparent conductive film such as ITO (indium tin oxide), the resistance thereof is high. As a result, the lag of the common signal varies depending on the position on the common electrode, which increases the susceptibility of the image displayed in the liquid crystal display device to display unevenness. Also, the load on the common signal line becomes high, increasing the likelihood of shadowing in the image. Liquid crystal display devices with a large display are particularly susceptible to these phenomena.

Increasing the number of common transfer electrodes disposed on the TFT substrate and reducing the connecting resistance between the common electrode and the common signal line is effective in order to reduce display unevenness in the image by decreasing variation in common signal lag depending on the position on the common electrode, and to reduce the occurrence of shadowing by decreasing the load on the common signal lines. Patent Document 1 discloses a configuration in which a plurality of gate drivers and a plurality of source drivers are disposed in order to increase the number of common transfer electrodes, and common transfer electrodes are formed in the spaces between adjacent gate drivers and source drivers.

RELATED ART DOCUMENT

Patent Document

Patent Document 1: Japanese Patent Application Laid-Open Publication No. 2002-6331

SUMMARY OF THE INVENTION

Problems to be Solved by the Invention

However, in recent years, as the size of the display and the resolution have increased in liquid crystal display devices, the source drivers have become higher output. In a liquid crystal display device driven by gate triple scan, the number of source drivers mounted on the TFT substrate has decreased. As a result, the number of spaces between adjacent source drivers and the width of the spaces has sometimes decreased. In such a case, not enough space is provided for the common signal lines, which reduces the number of common transfer electrodes disposed on the TFT substrate. As a result, it becomes difficult to reduce variation in the common signal lag depending on the position on the common electrode and to reduce the load on the common signal lines. As a result, the image displayed in the liquid crystal display device becomes susceptible to display unevenness and shadowing, which decreases display quality.

An object of the present invention is to provide a display device that can prevent a decrease in display quality of an image resulting from display unevenness or shadowing, and a method for manufacturing the same.

Means for Solving the Problems

A first aspect of the present invention is a display device that includes a first substrate and a second substrate facing each other with a display medium layer sandwiched therebetween, the first substrate having: a plurality of pixels having pixel electrodes; a first driver circuit that drives the pixels; a driver circuit mounting region having output terminals on which the first driver circuit is mounted; and a signal wiring line that supplies a prescribed signal, wherein the first driver circuit includes an unused output terminal section having a plurality of unused circuit output terminals gathered therein, wherein the driver circuit mounting region includes an open region where the output terminals are not present, in a position corresponding to the unused output terminal section, and wherein the signal wiring line passes through the open region.

In a second aspect, the present invention is the first aspect of the present invention, wherein the first substrate further includes a common transfer electrode, wherein the second substrate further includes a common electrode electrically connected to the common transfer electrode, wherein the prescribed signal is a common signal to be supplied to the common electrode, and wherein the signal wiring line is a common signal line for supplying the common signal to the common electrode through the common transfer electrode.

In a third aspect, the present invention is the second aspect of the present invention, wherein the first substrate further includes a substrate connecting region where a flexible wiring line substrate can be mounted, and wherein the common signal line electrically connects the substrate connecting region to the common transfer electrode.

In a fourth aspect, the present invention is the second aspect of the present invention, wherein the first driver circuit further includes a common signal generating part that generates the common signal, and wherein the common signal line electrically connects the common transfer electrode to the output terminals through which the common signal from the first driver circuit is outputted.

In a fifth aspect, the present invention is the third aspect of the present invention, wherein the first driver circuit is a one-chip driver that includes a source signal output part and a gate signal output part, and wherein the unused output terminal section includes a plurality of unused circuit output terminals of the source signal output part and a plurality of unused circuit output terminals of the gate signal output part that are disposed in a boundary between the source signal output part and the gate signal output part.

In a sixth aspect, the present invention is the third aspect of the present invention, wherein the unused output terminal section is disposed in a center of the first driver circuit.

In a seventh aspect, the present invention is the third aspect of the present invention, wherein the unused output terminal section is disposed away from a center of the first driver circuit.

In an eighth aspect, the present invention is the third aspect of the present invention, wherein the unused output terminal section is disposed at least a distance equal to a width of the unused output terminal section away from an edge of the first driver circuit.

In a ninth aspect, the present invention is the third aspect of the present invention, wherein the first driver circuit includes a plurality of second driver circuits, wherein the driver circuit mounting region includes a plurality of mounting regions for respectively mounting the plurality of second driver circuits, and wherein the open region is present in at least one of the plurality of mounting regions.

In a tenth aspect, the present invention is the third aspect of the present invention, wherein the first driver circuit includes a source driver and a gate driver, wherein the source driver and the gate driver are mounted in a row, and wherein the open region is present in at least one of a region where the source driver is mounted and a region where the gate driver is mounted, the regions being included in the driver circuit mounting region.

In an eleventh aspect, the present invention is the third aspect of the present invention, wherein the first driver circuit is a one-chip driver that includes a source signal output part and a gate signal output part, and wherein the open region is present in at least one of a region where the source signal output part is mounted and a region where the gate signal output part is mounted, the regions being included in the driver circuit mounting region.

In a twelfth aspect, the present invention is the first aspect of the present invention, wherein the prescribed signal is an auxiliary signal, and wherein the signal wiring line is an auxiliary capacitance line that supplies the auxiliary signal to the pixels.

In a thirteenth aspect, the present invention is the twelfth aspect of the present invention, wherein the first substrate further includes a common transfer electrode, wherein the second substrate further includes a common electrode electrically connected to the common transfer electrode, and wherein the auxiliary capacitance line further supplies a common signal to the common transfer electrode.

In a fourteenth aspect, the present invention is the first aspect of the present invention, further including source signal lines and gate signal lines electrically connected to the pixels, wherein the signal wiring line includes a first wiring line that surrounds the display region that includes the plurality of pixels, and wherein the first wiring line overlaps at least either of the source signal lines and the gate signal lines, insulated therefrom with an insulating film, in at least one position in a periphery of the display region.

In a fifteenth aspect, the present invention is the fourteenth aspect of the present invention, wherein the first wiring line includes a second wiring line disposed in the display region overlapping an end of at least either of the source signal lines and the gate signal lines, insulated therefrom with an insulating film, and a third wiring line disposed overlapping another end of at least either of the source signal lines and the gate signal lines for which the second wiring line is provided, insulated therefrom with an insulating film, and wherein the second wiring line and the third wiring line are electrically connected to each other so as to be able to apply the same prescribed signal.

In a sixteenth aspect, the present invention is the fourteenth aspect of the present invention, wherein the insulating film can be broken by applying an external energy thereon.

A seventeenth aspect of the present invention is a method of manufacturing a display device including a first substrate having a plurality of pixels with pixel electrodes and a second substrate having a common electrode, the first substrate and the second substrate facing each other with a display medium layer therebetween, the first substrate further including a driver circuit mounting region in which a first driver circuit that drives the pixels is mounted, a common transfer electrode that supplies a common signal to the common electrode, and a common signal line that is electrically connected to the common transfer electrode, the method including:

forming the common signal line and output terminals of the driver circuit mounting region by patterning a metal film formed on the first substrate;

forming an insulating film covering the common signal line and the output terminals;

forming an etching protective film on the insulating film;

patterning the etching protective film so as to leave the etching protective film on the common signal line;

etching the insulating film using the etching protective film as a mask, to expose a surface of each of the output terminals; and forming an electrode made of a transparent conductive film on the surface of each of the output terminals.

In an eighteenth aspect, the present invention is the seventeenth aspect of the present invention, wherein, in the step of removing the etching protective film, the etching protective film is left remaining on an edge of the output terminals.

In a nineteenth aspect, the present invention is the seventeenth aspect of the present invention, wherein the etching protective film is a semiconductor film.

In a twentieth aspect, the present invention is the seventeenth aspect of the present invention, wherein the etching protective film is a thinned out photosensitive resin film.

In a twenty-first aspect, the present invention is the twentieth aspect of the present invention, wherein the photosensitive resin film is thinned out by exposure and development using a halftone mask or a graytone mask.

Effects of the Invention

According to the first aspect, a signal wiring line that supplies a prescribed signal is formed in an open region provided corresponding to an unused output terminal section where a plurality of unused circuit output terminals included in the first driver circuit are collectively disposed. In such a case, by adjusting the position and number of unused output terminal sections, it is possible to adjust the width and length of the signal wiring line to optimal values, and to supply the prescribed signal to a desired position. Thus, it is possible to prevent a decrease in display quality in the display device.

According to the second aspect, the open region is provided in a position in the driver circuit mounting region corresponding to the unused output terminal section of the first driver circuit. The common signal line is connected to the common transfer electrode so as to pass through the open region. It is thus possible to shorten the length of the common signal line, and to position the common transfer electrode in a desired location. In this manner, variation in common signal lag for each position on the common electrode can be mitigated, thus reducing display unevenness in the image. The width of the open region is also increased, allowing the width of the common signal line to also be increased. As a result, the load on the common signal line is decreased, and thus, shadowing in the image can be reduced.

According to the third aspect, it is possible to supply a common signal to the common electrode from an external source by providing the substrate connecting region, and thus, there is no need to generate a common signal in the first driver circuit. As a result, the first driver circuit can be made smaller, thus allowing the display device to be miniaturized.

According to the fourth aspect, the common signal supplied to the common transfer electrode is generated in the common signal generating part in the first driver circuit, and thus, it is possible to shorten the length of the common signal line. As a result, the load on the common signal line is decreased, and thus, shadowing can be reduced.

According to the fifth aspect, the plurality of unused circuit output terminals are collectively formed in the boundary between the source signal output part and the gate signal output part of the one-chip driver. In this case, in the unused output terminal section, the unused circuit output terminals of not only the source signal output part, but also the gate signal output part are gathered, and thus, the unused output terminal section is widened. Thus, the resistance of the common signal line can be reduced, and therefore, display unevenness and shadowing can be mitigated.

According to the sixth aspect, the unused output terminal section of the first driver circuit is provided in the center, and thus, the open region where the common signal line is formed is formed in the center of the driver circuit mounting region. As a result, it is possible to dispose the common transfer electrode in the center of the frame region. Thus, it is possible to increase the pitch between lead-out lines connected to the output terminals of the driver circuit mounting region, thus reducing defects due to short-circuiting in the lead-out lines.

According to the seventh aspect, by providing the unused output terminal section of the first driver circuit in a position away from the center, the open region of the driver circuit mounting region is disposed in a position away from the center. As a result, it is possible to dispose the common transfer electrode in a desired position in the frame region.

According to the eighth aspect, the unused output terminal section of the first driver circuit is formed in a position that is a distance at least equal to the width of the unused output terminal section away from the edge thereof. In such a case, the open region of the driver circuit mounting region is also disposed in a position that is the distance equal to the width of the unused output terminal section away from the edge, and thus, compared to a case in which the open region is disposed on the edge of the driver circuit mounting region, the length of the lead-out line can be shortened. As a result, the pitch of the lead-out lines can be widened, thus reducing defects resulting from short-circuiting in the lead-out lines.

According to the ninth aspect, it is possible to increase the number of common transfer electrodes in a high resolution display device with a large screen that needs a plurality of second driver circuits. In addition, the position of the common transfer electrode can be adjusted with ease. In this manner, variation in common signal lag for each position on the common electrode can be mitigated, thus reducing display unevenness in the image.

According to the tenth aspect, in the display device in which the source driver and the gate driver are mounted in a row, an open region is provided in at least one of the regions where the respective drivers are mounted. With this configuration, it is possible to dispose a common transfer electrode in a region where gate lead-out lines or source lead-out lines are not concentrated.

The eleventh aspect has effects similar to the tenth aspect.

According to the twelfth aspect, an auxiliary capacitance line that supplies an auxiliary signal is formed in the open region formed in the driver circuit mounting region. Therefore, it is possible to increase the number of auxiliary capacitance lines and shorten the length thereof, and thus, it is possible to decrease lag in the auxiliary signal supplied to the respective pixels. As a result, it is possible to stabilize the size of the auxiliary capacitance provided parallel to the liquid crystal capacitance of each pixel, and thus, it is possible to mitigate the occurrence of shadowing, flickering, and the like.

According to the thirteenth aspect, the auxiliary capacitance line not only supplies an auxiliary signal to the pixels, but also supplies a common signal to the common transfer electrode connected to the auxiliary capacitance line. As a result, even if a common transfer electrode is provided, it is not necessary to form a common signal line separate from the auxiliary capacitance line. As a result, the pitch of the lead-out lines can be widened, thus reducing defects due to short-circuiting in the lead-out lines.

According to the fourteenth aspect, the first wiring line overlaps at least either of the source signal lines or the gate signal lines, insulated therefrom with an insulating film, in at least one location in the periphery of the display region. If the insulating film is broken, the first wiring line is connected to at least either of the source signal lines or the gate signal lines in at least one location. As a result, using the first wiring line, it is possible to confirm whether or not a prescribed signal is being outputted to the pixels from the first driver circuit.

According to the fifteenth aspect, the second wiring line overlaps an end of at least either of the source signal lines or the gate signal lines, insulated therefrom with the insulating film, in the periphery of the display region. The third wiring line overlaps another end of at least either of the source signal lines or the gate signal lines for which the second wiring line is provided, insulated therefrom with the insulating film, in the periphery of the display region. If the insulating film broken on both ends, the second wiring line is electrically connected to one end of at least either of the source signal lines or the gate signal lines, and the third wiring line is electrically connected to the other end of at least either of the source signal lines or the gate signal lines. Also, the second wiring line and the third wiring line are electrically connected to each other so as to be able to apply the same prescribed signal. As a result, even if there were a disconnection in a source signal line or a gate signal line, it is possible to supply the same prescribed signal from both ends of the source signal line or the gate signal line with the disconnection, thus increasing the yield of the display device and decreasing the manufacturing cost.

According to the sixteenth aspect, the insulating film can break when energy is applied from an external source, and thus, at least either of the source signal lines or the gate signal lines can be connected to the first wiring line in a periphery of the pixels.

According to the seventeenth aspect, the surface of the common signal line is protected by an etching protective film. As a result, the common signal line is not removed entirely or thinned out due to being etched in steps that follow. In such a case, it is possible to prevent the common signal line 30 from becoming non-conductive or from having a high resistance, and thus, it is possible to prevent lag in the common signal and to prevent a high load on the common signal line. Thus, by reducing the occurrence of display unevenness of the image and the occurrence of shadowing, it is possible to prevent a decrease in display quality.

According to the eighteenth aspect, even if a metal susceptible to corrosion is included in the output terminals, the edge of the output terminals is covered by the etching protective film, thus preventing the output terminals from corroding from the edge.

According to the nineteenth aspect, the etching protective film is formed in the same step as the channel regions of the thin film transistors included in the pixels of the display device, thus simplifying the manufacturing process of the display device.

According to the twentieth aspect, a photosensitive resin film is used as the etching protective film, and thus, it is possible to set the thickness of the etching protective film independent of the thickness of the semiconductor film that constitutes the channel region of the thin film transistor. Thus, it is possible to effectively prevent the common signal line from being completely removed or thinned out by being etched.

According to the twenty-first aspect, by using a halftone mask or a graytone mask, it is possible to thin out the photosensitive resin film with ease.

DETAILED DESCRIPTION OF EMBODIMENTS

<1. Embodiment 1>
<1.1 Configuration of Liquid Crystal Display Device>

Figure 1A:
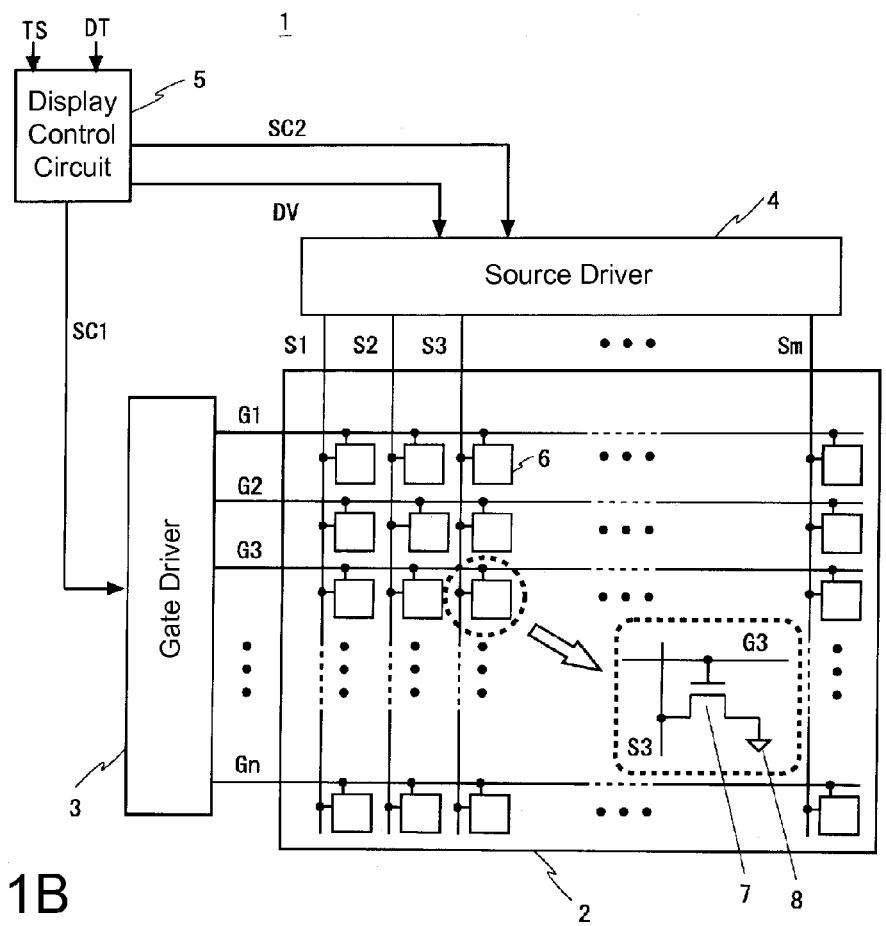
FIG. 1A is a block diagram showing a configuration of an active matrix liquid crystal display device according to Embodiment 1 of the present invention.
Figure 1B:
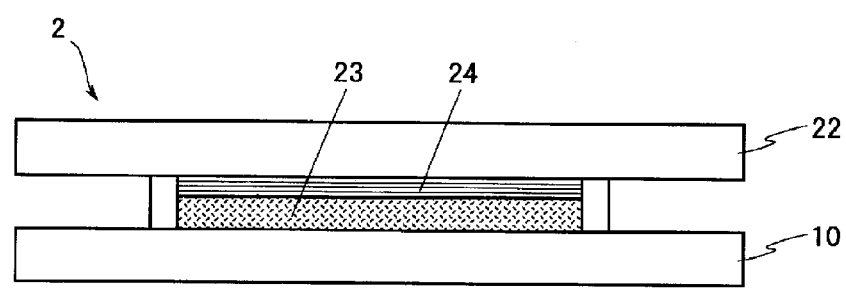
FIG. 1B is a cross-sectional view of a liquid crystal panel included in the liquid crystal display device in FIG. 1A.

FIG. 1A is a block diagram that shows a configuration of an active matrix liquid crystal display device 1 according to Embodiment 1 of the present invention, and FIG. 1B is a cross-sectional view of a liquid crystal panel 2 included in the liquid crystal display device 1 shown in FIG. 1A. As shown in FIG. 1A, the liquid crystal display device 1 includes the liquid crystal panel 2, a gate driver 3, a source driver 4, and a display control circuit 5. The gate driver 3 and the source driver 4 are sometimes collectively referred to as "first driver circuits." If a plurality of either the gate drivers 3 or the source drivers 4 are included in embodiments or application examples below, then these are sometimes collectively referred to as "second driver circuits."

As shown in FIG. 1B, the liquid crystal panel 2 includes a TFT substrate 10 (also referred to as a "first substrate"), an opposite substrate 22 (also referred to as a "second substrate"), and a liquid crystal layer 23 (also referred to as a "display medium layer") sandwiched between the TFT substrate 10 and the opposite substrate 22. The TFT substrate 10 includes an "m" ("m" being an integer of at least 1) number of source signal lines S1 to Sm, an "n" ("n" being an integer of at least 1) number of gate signal lines G1 to Gn, and an (m×n) number of pixels 6. The gate signal lines G1 to Gn are disposed horizontally and parallel to each other, and the source signal lines S1 to Sm are disposed intersecting orthogonally with the gate signal lines G1 to Gn and parallel to each other. The pixels 6 are respectively disposed in the vicinities of the intersection points between the gate signal lines G1 to Gn and the source signal lines S1 to Sm. The (m×n) number of pixels 6 are arranged in a matrix with an "m" number of pixels in the row direction and an "n" number of pixels in the column direction. A source signal line Sj ("j" being an integer between 1 and "m" inclusive) is connected to all pixels 6 in column number "j," and a gate signal line Gi ("i" being an integer between 1 and "n" inclusive) is connected to all pixels 6 in the row number "i." The opposite substrate 22 includes a common electrode 24 provided in common for the plurality of pixels 6, and color filters (not shown in drawings) for displaying color images.

Control signals TS such as a horizontal synchronizing signal and a vertical synchronizing signal, and display image data DT are applied to the display control circuit 5 from an external source. The display control circuit 5 outputs a control signal SC1 to the gate driver 3 and outputs a control signal SC2 and a digital image signal DV to the source driver 4, based on the control signal TS and the display image data DT.

The gate driver 3 outputs signals selectively to the gate signal lines G1 to Gn in sequential order based on the control signal SC1. With this configuration, one gate signal line G1 to Gn is selected at a time in order, which means that one row of pixels 6 is selected at a time.

The source driver 4 applies signal voltages corresponding to the digital image signal DV to the source signal lines S1 to Sm based on the control signal SC2 and the digital image signal DV. The pixels 6 include TFTs 7 that function as switching elements. The source electrode of each TFT 7 is connected to one of the source signal lines S1 to Sm, the gate electrode thereof is connected to one of the gate signal lines G1 to Gn, and the drain electrode thereof is connected to a pixel electrode 8. When the TFT 7 is in the ON state, signal voltages are applied to a selected row of pixels 6 from the source signal lines S1 to Sm. The signal voltages applied to the pixels 6 are held by the pixel electrodes 8 and the common electrode 24, and as a result, an image is displayed in the liquid crystal panel 2.

Figure 2:
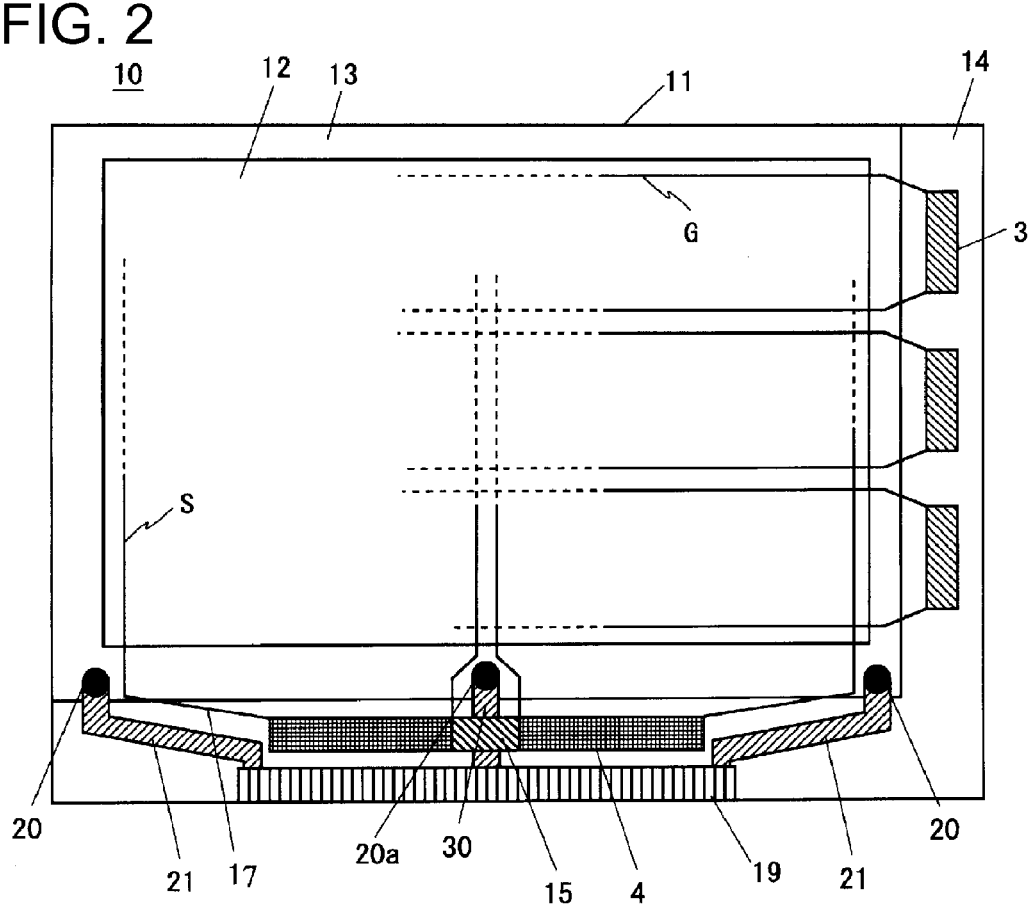
FIG. 2 is a drawing that shows a configuration of a TFT substrate included in the liquid crystal display device shown in FIG. 1.

FIG. 2 is a drawing that shows a configuration of the TFT substrate 10 included in the liquid crystal display device 1 shown in FIG. 1. As shown in FIG. 2, the TFT substrate 10 is formed on an insulating substrate 11 made of glass or the like. The TFT substrate 10 includes a display region 12 that displays an image in the center, a frame region 13 provided surrounding the display region 12, and an element region 14 provided from the bottom edge to the right edge of the TFT substrate 10.

In the display region 12, the plurality of gate signal lines G extending in the horizontal direction and the plurality of source signal lines S extending in a direction intersecting with the gate signal lines G are formed. Pixels (not shown in drawings) are provided in the vicinities of the respective intersection points between the gate signal lines G and the source signal lines S.

In the element region 14 on the bottom edge, the source driver 4 is mounted in the source driver mounting region (not shown in drawings). The element region 14 on the right edge has three gate drivers 3 mounted in a row in a gate driver mounting region (not shown in drawings). In the present embodiment, the source driver 4 will be described, omitting descriptions of the gate drivers 3.

An FPC connecting region 19 (also referred to as a "substrate connecting region") for mounting a flexible printed circuit substrate (referred to as an FPC substrate) for supplying a power signal, a common signal, and the like from an external source to the source driver 4 is provided along the edge of the element region 14 on the bottom edge. In the FPC connecting region 19, a plurality of FPC connecting terminals (not shown in drawings) are provided for respective output terminals of the FPC substrate.

A common signal line 21 extending to the lower left corner of the frame region 13 from the left edge of the FPC connecting region 19, and a common signal line 21 extending to the lower right corner of the frame region 13 from the right edge of the FPC connecting region 19 are formed. In the center of the source driver mounting region, an open region (not shown in drawings) described later is provided, and a common signal line 30 that extends in a straight line from the center of the FPC connecting region 19 through the open region to the frame region 13 is provided. In the center of the source driver 4, an unused output terminal section 15 to be described later is provided in the open region.

Common transfer electrodes 20, 20, and 20a are respectively provided in the lower right corner, the lower left corner, and the center of the frame region 13, and the common transfer electrodes 20, 20, and 20a are respectively connected electrically to the common signal lines 21, 21, and 30. The common transfer electrodes 20, 20, and 20a are electrically connected to the common electrode 24 through conductive particles (an elastic body coated with gold or silver, for example) or the like. With this configuration, the common signal supplied from an external source through the FPC substrate is supplied to the common electrode 24 on the opposite substrate 22 through the common transfer electrodes 20, 20, and 20a. The source signal lines S and the gate signal lines G are formed in the display region 12, and the source signal lines S are connected to the source driver 4 through the source lead-out lines 17. In the present specification, "connected" means "electrically connected" unless otherwise noted.

Figure 3:
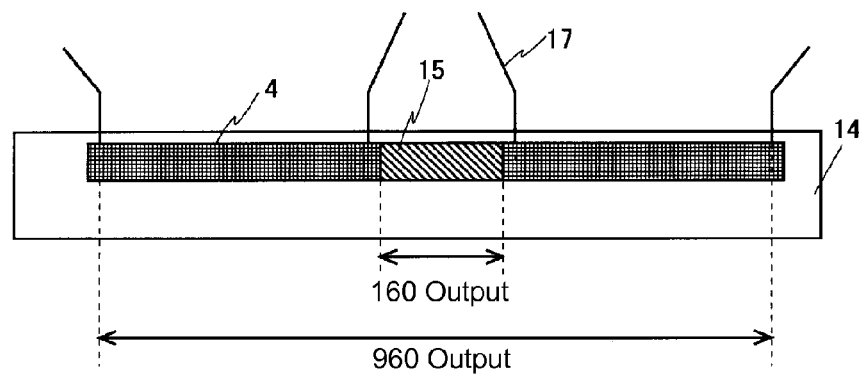
FIG. 3 is a drawing that shows an unused output terminal section of a source driver mounted on the TFT substrate shown in FIG. 2.

FIG. 3 is a drawing that shows the unused output terminal section 15 of the source driver 4 shown in FIG. 2. As shown in FIG. 3, if the total number of output bumps in the source driver 4 is 960 and the source driver 4 operates in a mode in which only 800 output bumps are used, then 160 output bumps are not used. In such a case, as shown in FIG. 3, the unused output bumps are collectively disposed in the center of the source driver 4. The section in which the unused output bumps out of all the output bumps of the source driver 4 are disposed in this manner is referred to as the unused output terminal section 15. The output bumps of the unused output terminal section 15 are not used, and therefore, the unused output terminal section 15 is not connected to a source lead-out line 17.

Figure 4:
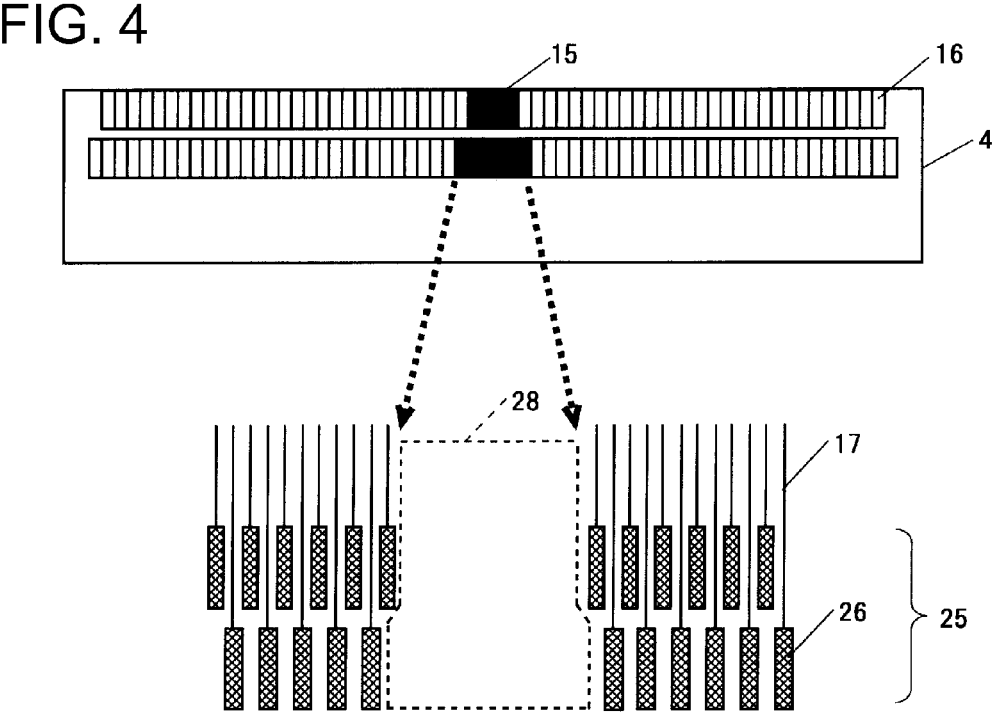
FIG. 4 is a drawing that shows a positional relation between the unused output terminal section of the source driver in the TFT substrate shown in FIG. 2, and an open region of the source driver mounting region.

FIG. 4 is a drawing that shows the positional relation between the unused output terminal section 15 of the source driver 4, and an open region 28 of the source driver mounting region 25. As shown in FIG. 4, a large number of output bumps 16 (sometimes referred to as "circuit output terminals") are disposed along one long side of the source driver 4. When designing the layout of the source driver 4, the unused output bumps out of all of the output bumps 16 are gathered in the center of the source driver 4, and designated as the unused output terminal section 15. As a result, there is no need to provide the output terminals 26 in the source driver mounting region 25 where the unused output terminal section 15 of the source driver 4 is provided. In this manner, a region 28 (hereinafter referred to as the "open region 28") where the output terminals 26 are not formed is formed in the source driver mounting region 25.

Figure 5:
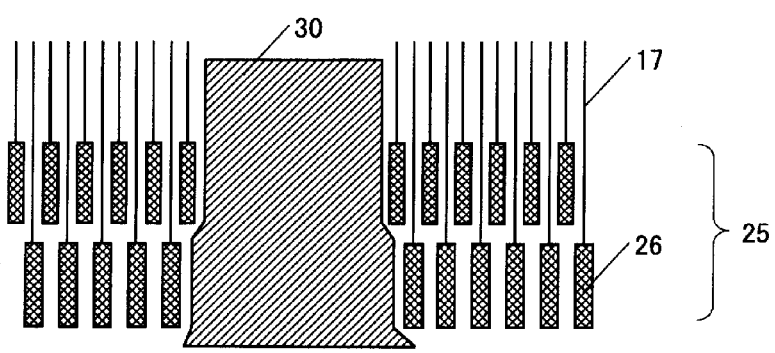
FIG. 5 is a drawing that shows a common signal line formed in the open region shown in FIG. 4.

FIG. 5 is a drawing in which the common signal line 30 is formed in the open region 28. As shown in FIG. 5, by forming the common signal line 30 in the open region 28, it is possible for the common signal line 30 to connect the FPC connecting region 19 to the common transfer electrode 20a at the shortest distance possible.

Figure 6A:
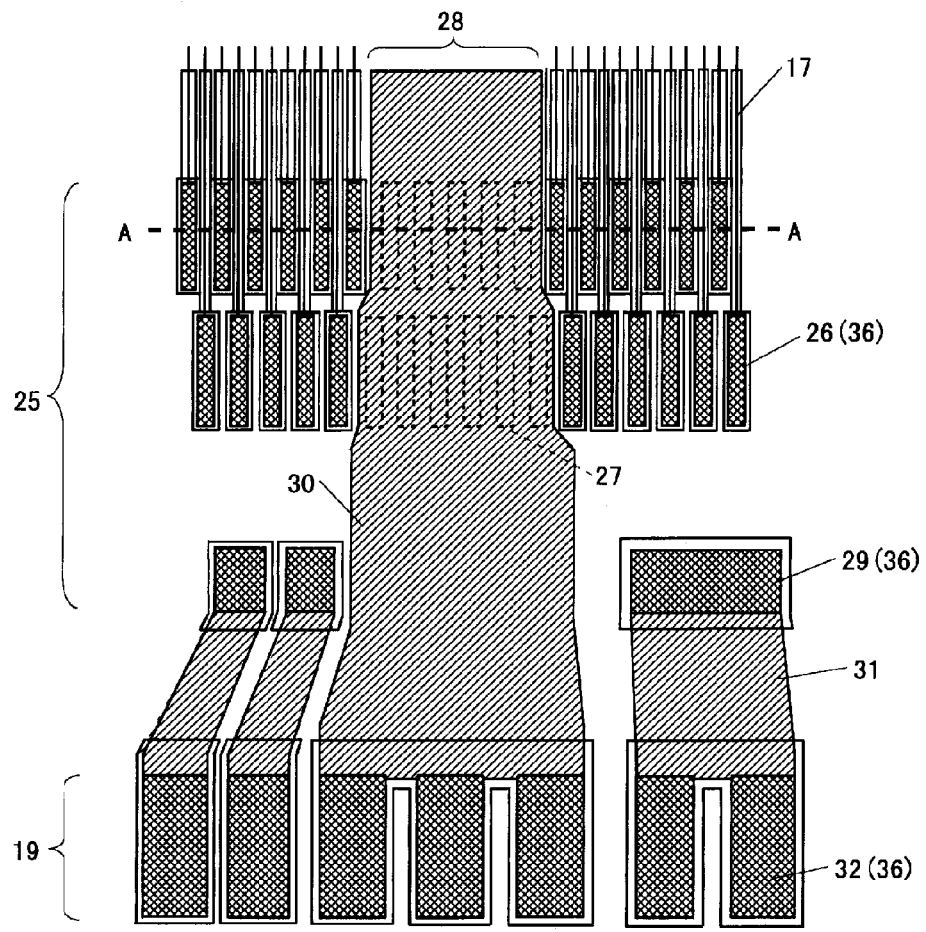
FIG. 6A is a plan view that shows a common signal line formed in the open region of the source driver mounting region.

FIG. 6A is a plan view that shows the common signal line 30 formed in the open region 28 of the source driver mounting region 25. As shown in FIG. 6A, in the FPC connecting region 19, a plurality of FPC connecting terminals 32 are formed on the insulating substrate 11 in order to connect to the terminals of the FPC substrate. The source driver mounting region 25 is formed at a prescribed distance from the FPC connecting region 19. In the source driver mounting region 25, a plurality of input terminals 29 disposed in one row and the plurality of output terminals 26 disposed in two rows are formed parallel to each other with a prescribed gap therebetween. Each input terminal 29 is connected to a corresponding FPC connecting terminal 32 through a connecting line 31. Each output terminal 26 is connected to each source lead-out line 17. In the open region 28 of the source driver mounting region 25, the common signal line 30 for supplying a common signal to the common transfer electrode 20a is formed instead of the output terminals 26. The dotted lines in FIG. 6A show where the output terminals 27 would have been formed if the open region 28 were not formed there.

By mounting the FPC substrate in the FPC connecting region 19 using an anisotropic conductive film, each terminal of the FPC substrate is connected to a corresponding FPC connecting terminal 32. By mounting the source driver 4 in the source driver mounting region 25, each input bump (sometimes referred to as a "circuit input terminal") of the source driver 4 is connected to a corresponding input terminal 29, and each output bump is connected to a corresponding output terminal 26. As a result, signal voltages are outputted to the source signal lines S with a prescribed timing.

Figure 6B:
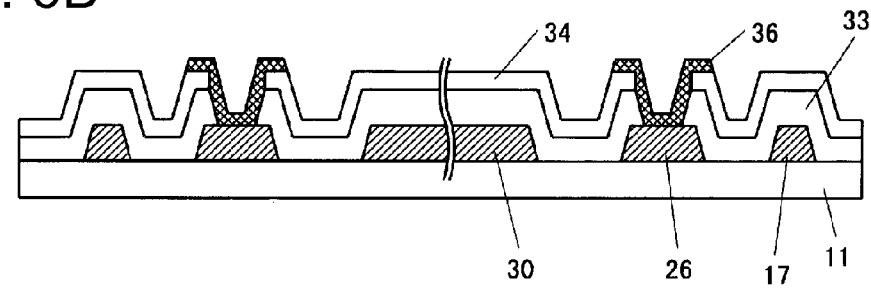
FIG. 6B is a cross-sectional view of the source driver mounting region along the line A-A of the FIG. 6A.
Figure 7A:
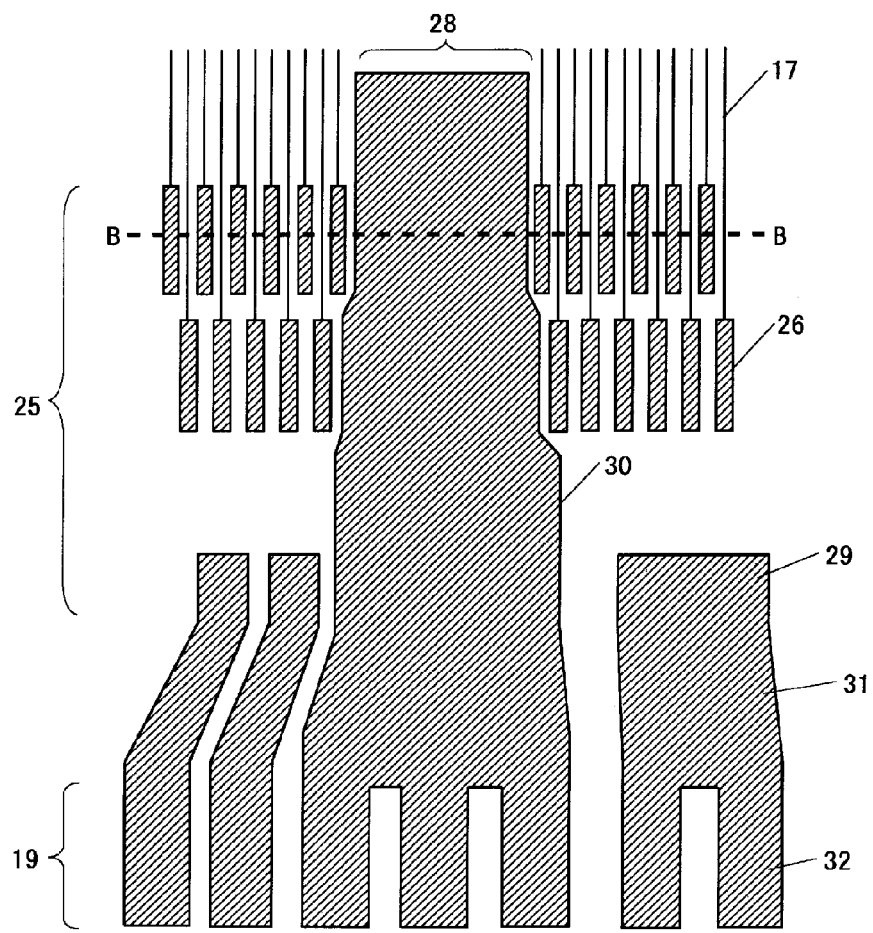
FIG. 7A is a plan view that shows a step of patterning the common signal line.
Figure 7B:
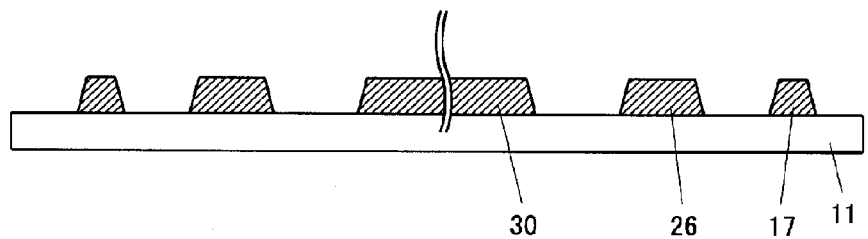
FIG. 7B is a cross-sectional view of the source driver mounting region along the line B-B of FIG. 7A.

FIG. 6B is a cross-sectional view of the source driver mounting region 25 along the line A-A shown in FIG. 6A. The common signal line 30 and the output terminals 26 shown in FIG. 6B are formed at the same time as the gate electrodes of the TFTs 7. Thus, the common signal line 30 and the output terminals 26 are made of the same metal as the gate electrodes of the TFTs 7. Specifically, they are made of a metal film in which titanium nitride (TiN with a thickness of 30 to 150 nm), aluminum (Al with a thickness of 100 to 200 nm), and titanium (Ti with a thickness of 10 to 30 nm) are layered in this order. Besides this, a layered metal film such as a metal film in which aluminum is layered on top of molybdenum (Mo) and a metal film in which chromium (Cr) is layered on top of aluminum, or a single layer metal film including only molybdenum, only chromium, or the like may be used.

An insulating film 33 with a thickness of 0.3 to 0.5 μm is layered on top of the common signal line 30. The insulating film 33 is formed at the same time as forming the gate insulating film of the TFT 7, and is made of a silicon nitride ($SiN_x$), a silicon oxide ($SiO_x$), or the like, the same material being used in the gate insulating film of the TFT 7. A semiconductor film 34 is layered on the insulating film 33 (hereinafter referred to as the "gate insulating film 33"). The semiconductor film 34 is an intrinsic amorphous silicon film formed at the same time as the channel region of the TFT 7. The semiconductor film 34 immediately after being formed is a multilayer film made of an $n^+$ amorphous silicon film (40 to 60 nm in thickness) formed on an intrinsic silicon film (100 to 230 nm in thickness). However, as will be described later, the semiconductor film 34 is used as an etching protective film for the common signal line 30, and the semiconductor film 34 becomes thinner as a result of etching. The thickness of the semiconductor film 34 remaining over the common signal line 30 becomes approximately half the thickness of the semiconductor film 34 covered by the source electrode or the drain electrode of the TFT 7, for example. Thus, the semiconductor film 34 left remaining on the gate insulating film 33 at the end becomes solely an intrinsic silicon film that is thin.

On the other hand, the semiconductor film 34 and the gate insulating film 33 on the output terminals 26 are removed, thus exposing the surface of the output terminals 26 made of a metal film. However, the edges of the output terminals 26 are protected by the gate insulating film 33 and the semiconductor film 34. A transparent conductive film 36 is formed on the exposed surface of the output terminals 26. The transparent conductive film 36 is made of a conductive film such as ITO (indium tin oxide) and IZO (indium zinc oxide), and is formed at the same time as the pixel electrodes. The source lead-out line 17 connected to each output terminal 26 is made of the same metal material as the common signal line 30, and the surface of the source lead-out line 17 is protected by the gate insulating film 33 and the semiconductor film 34.

In the present embodiment, a case in which only one unused output terminal section 15 is provided in the center of the source driver 4 was described. However, a position where the unused output terminal section 15 is provided is not limited to the center of the source driver 4, and may be anywhere. Also, the number of unused output terminal sections 15 is not limited to one, and a plurality of unused output terminal sections 15 may be provided.

<1.2 Method for Forming Source Driver Mounting Region>

In a process of forming the TFT substrate 10 including the source driver mounting region 25, five photomasks are used in order to pattern the gate layer, the semiconductor film, the source metal, the protective film, and the pixel electrodes. Steps of forming the input terminals 29, the output terminals 26, and the common signal line 30 in the source driver mounting region 25 using these photomasks will be described. Of the steps that use the photomasks, a description of a step of patterning the source metal will be omitted because the source metal used in order to form the source/drain electrodes of the TFT 7 will all be removed after film forming in the source driver mounting region 25.

FIGS. 7 to 10 show each step of forming the source driver mounting region 25 for each photomask used. FIG. 7A is a plan view that shows a step of patterning the common signal line 30, and FIG. 7B is a cross-sectional view of the source driver mounting region 25 along the line B-B shown in FIG. 7A. As shown in FIGS. 7A and 7B, a metal film (not shown in drawings) is formed on the insulating substrate 11 by sputtering, and a resist pattern (not shown in drawings) is formed using a photomask for patterning the gate layer. Next, the metal film is patterned using the resist pattern as a mask. As a result, the FPC connecting terminals 32, the input terminals 29 and the output terminals 26 of the source driver mounting region 25, the connecting lines 31 that connect the input terminals 29 to the FPC connecting terminals 32, the common signal line 30, and the source lead-out lines 17 are formed. The metal film constituting each terminal is sometimes referred to as a "lower electrode."

Figure 8A:
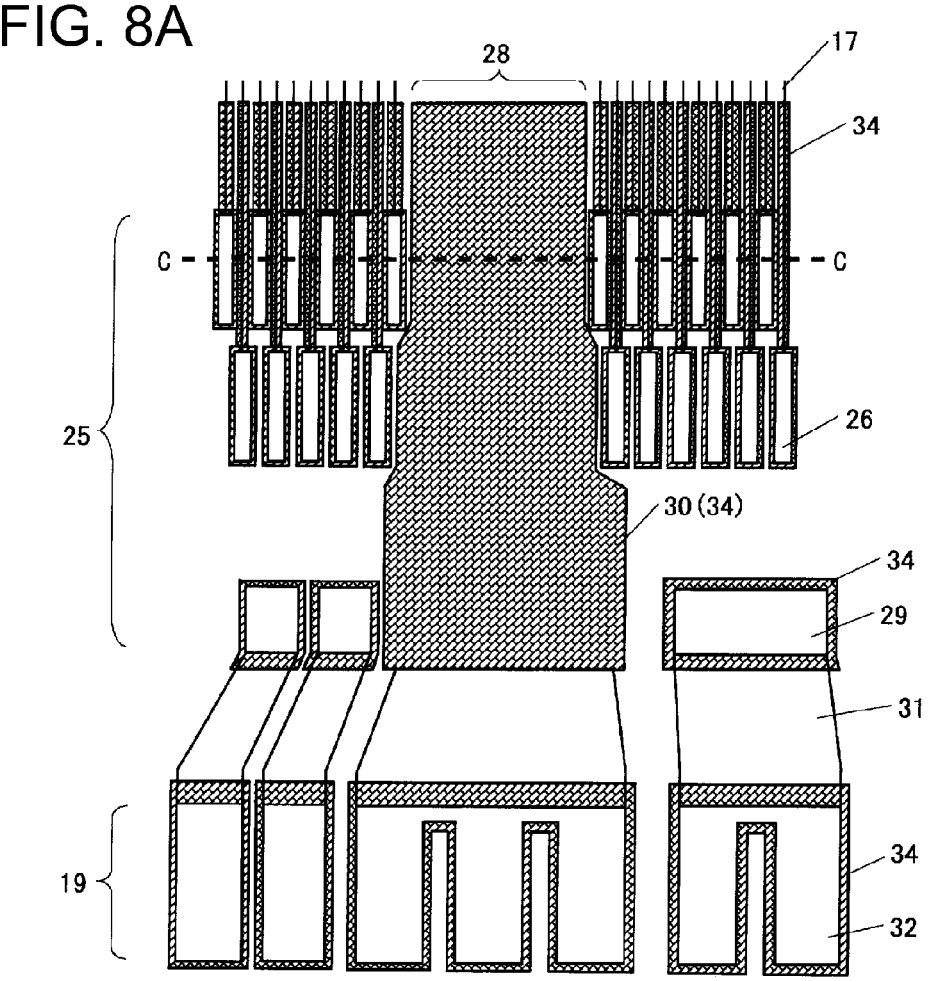
FIG. 8A is a plan view that shows a step of forming an etching protective film on the common signal line.
Figure 8B:
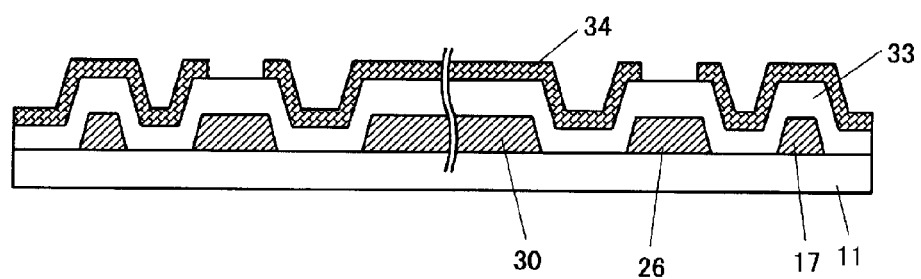
FIG. 8B is a cross-sectional view of the source driver mounting region along the line C-C of FIG. 8A.

FIG. 8A is a plan view that shows a step of forming the etching protective film on the common signal line 30, and FIG. 8B is a cross-sectional view of the source driver mounting region 25 along the line C-C shown in FIG. 8A. As shown in FIGS. 8A and 8B, the gate insulating film 33 and the semiconductor film 34 are layered in this order by CVD (chemical vapor deposition). A photomask for patterning the semiconductor film 34 is used, forming a resist pattern (not shown in drawings). The resist pattern covers the entire upper surface of the common signal line 30 and the source lead-out lines 17 in the source driver mounting region 25, and the edges of the FPC connecting terminals 32, the input terminals 29, and the output terminals 26. The semiconductor film 34 is removed by etching using the resist pattern as a mask. As a result, on the surfaces of the FPC connecting terminals 32, the connecting lines 31, the input terminals 29, and the output terminals 26, the gate insulating film 33 is exposed. However, the edges thereof are covered by the gate insulating film 33 and the semiconductor film 34. The edges are covered by the gate insulating film 33 and the semiconductor film 34 in order to prevent the metal films from corroding from the edges if a metal film susceptible to corrosion such as aluminum is included in the lower electrodes of the respective terminals. Thus, if the lower electrode of each terminal does not include a metal film susceptible to corrosion such as aluminum, it is possible not to cover the edges with the gate insulating film 33 and the semiconductor film 34.

A silicon nitride film (not shown in drawings) with a thickness of approximately 0.3 µm is formed by CVD. Next, an acrylic resin film (not shown in drawings) is layered on the silicon nitride film by spin-coating to a thickness of 1 to 4 µm, thus forming a protective film constituted of the silicon nitride film and the acrylic resin film. The silicon nitride film is sometimes referred to as a "lower protective film," and the acrylic resin film is sometimes referred to as an "upper protective film."

Figure 9A:
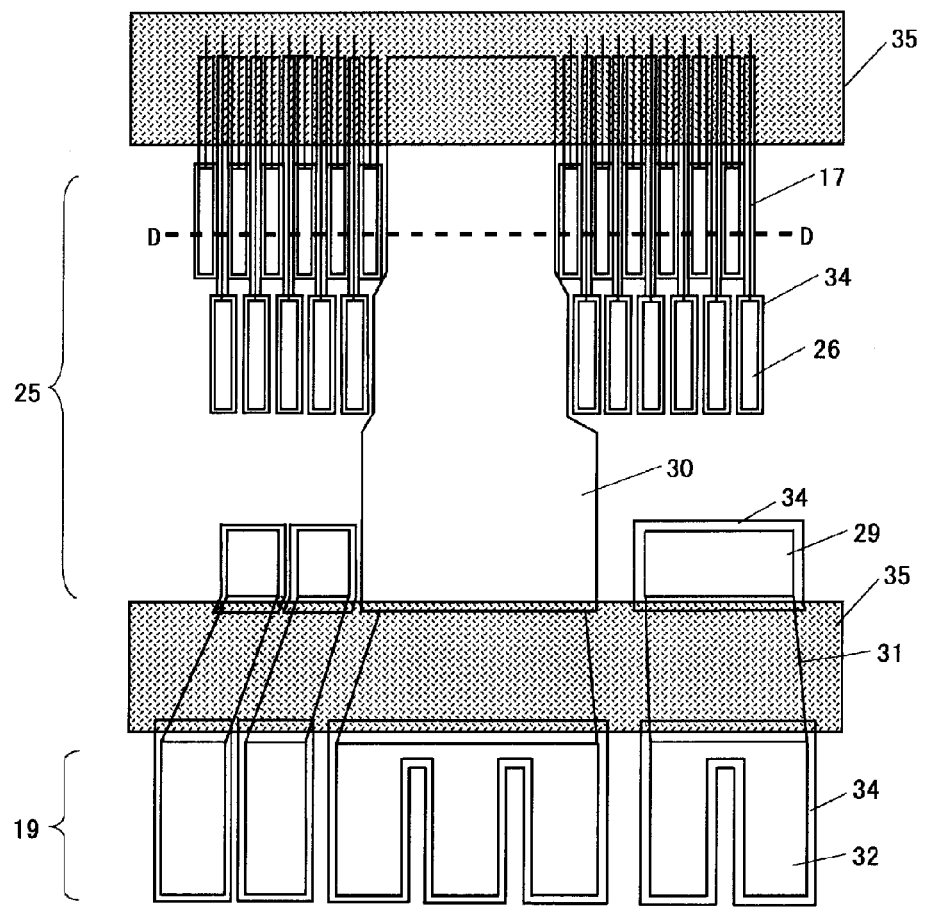
FIG. 9A is a plan view that shows a step of removing the protective film on the common signal line.
Figure 9B:
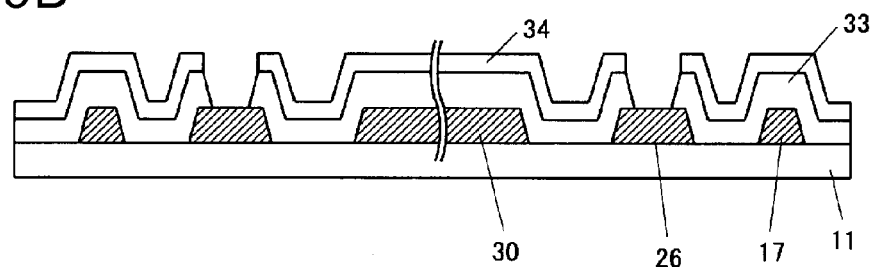
FIG. 9B is a cross-sectional view of the source driver mounting region along the line D-D of FIG. 9A.

FIG. 9A is a plan view that shows a step of removing the protective film on the common signal line 30, and FIG. 9B is a cross-sectional view of the source driver mounting region 25 along the line D-D shown in FIG. 9A. As shown in FIGS. 9A and 9B, the acrylic resin film is patterned using a photomask for patterning the protective film. As a result, a pattern 35 made of an acrylic resin with large openings that expose the FPC connecting region 19 and the source driver mounting region 25 is formed. Using the pattern 35 as a mask, the silicon nitride film and the gate insulating film 33 are removed. This exposes the surface of the metal films of the FPC connecting terminals 32, the input terminals 29, and the output terminals 26. At this time, the gate insulating film 33 on the common signal line 30 is covered by the semiconductor film 34, which means that the surface of the common signal line 30 is not exposed. In this manner, the semiconductor film 34 functions as the etching protective film, and thus, the semiconductor film 34 is sometimes thinned out or completely removed in the step of removing the silicon nitride film and the gate insulating film 33. The reason for forming an opening in the entire source driver mounting region 25 is to ensure that the gate insulating film 33 on the input terminals 29 and the output terminals 26 is completely removed, which prevents contact defects and the like from occurring due to the step of the protective film when connecting the input bumps and the output bumps of the source driver 4 to the input terminals 29 and the output terminals 26, respectively, using an anisotropic conductive film.

Figure 10A:
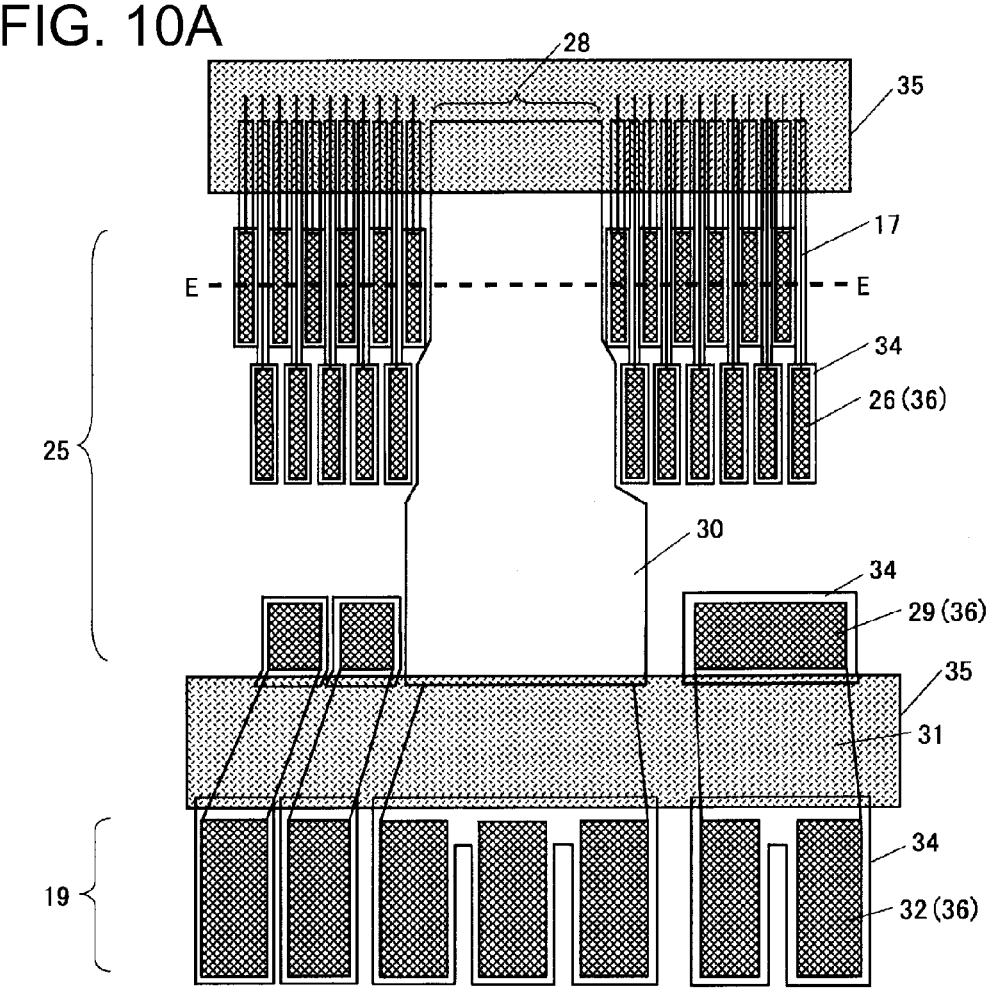
FIG. 10A is a plan view that shows a step of forming a transparent conductive layer.
Figure 10B:
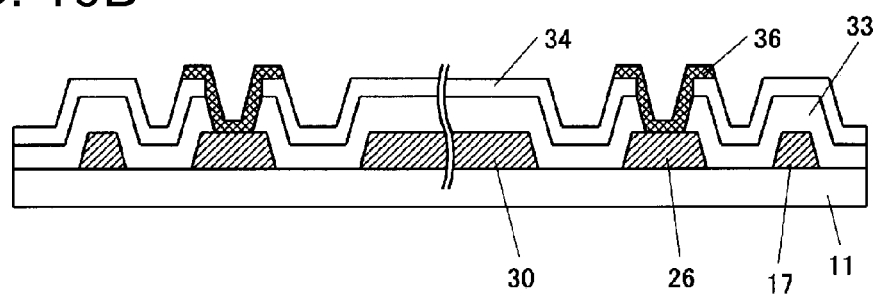
FIG. 10B is a cross-sectional view of the common signal line along the line E-E of FIG. 10A.

FIG. 10A is a plan view that shows a step of forming the transparent conductive film 36, and FIG. 10B is a cross-sectional view of the source driver mounting region 25 along the line E-E shown in FIG. 10A. As shown in FIGS. 10A and 10B, the transparent conductive film is formed by sputtering. Next, using a photomask for patterning the transparent conductive film, a resist pattern (not shown in drawings) is formed on the surface of the FPC connecting terminals 32, the input terminals 29, and the output terminals 26. By patterning the transparent conductive film using the resist pattern as a mask, transparent conductive films 36 that are connected to the lower electrodes of the FPC connecting terminals 32, the input terminals 29, and the output terminals 26 are formed. The transparent conductive films 36 formed in this manner are referred to as the "upper electrodes" or the "electrodes" of the respective terminals. With this step, pixel electrodes are formed in the pixels.

The common signal line 30 is protected by the semiconductor film 34, and thus, the common signal line 30 is not be removed entirely or thinned out due to being etched in steps that follow. Thus, it is possible to prevent the common signal line 30 from being non-conductive or having a high resistance, thus preventing common signal lag. Also, it is possible to reduce the load on the common signal line 30. As a result, it is possible to reduce display unevenness in the image and reduce the occurrence of shadowing.

By using the semiconductor film 34 as the etching protective film, the etching protective film can be formed in the same step as the channel region of each TFT 7. In this manner, it is possible to simplify the manufacturing process of the liquid crystal display device 1.

The source lead-out lines 17 are made of the same metal material as the output terminals 26, and the source signal lines S are made of a source metal. Thus, it is necessary to connect the source lead-out lines 17 to the source signal lines S in the frame region 13. The lower electrodes of the output terminals 26 and the source lead-out lines 17 may be made of a source metal as in the source signal lines S.

In the description above, a case in which the semiconductor film 34 is used as the etching protective film of the common signal line 30 was described. However, a source metal film, a photosensitive resin film, or the like can be used as the etching protective film. However, if a photosensitive resin film is used as the etching protective film, the photosensitive resin film would be too thick, and thus, the photosensitive resin film would need to be thinned. Thinning of the photosensitive resin film would be conducted by exposure and development using a halftone mask or a graytone mask.

By using the thinned out photosensitive resin film as an etching protective film, it is possible to leave remaining on the common signal line 30 the gate insulating film and the lower protective film, or the gate insulating film, the lower protective film, and the photosensitive resin film that has been thinned out. By using the photosensitive resin film as an etching protective film in this manner, it is possible to set the thickness of the etching protective film separate from the channel regions of the TFTs 7. Thus, it is possible to reliably prevent the common signal line 30 from being completely removed or thinned out by being etched. By using a halftone mask or a graytone mask, it is possible to thin the photosensitive resin film with ease.

Including the cases described above, the protective film remaining on the common signal line 30 at the end can include: only a gate insulating film; a gate insulating film and a semiconductor film; a gate insulating film, a semiconductor film, and a source metal; a gate insulating film and a source metal; a gate insulating film and a lower protective film; and a gate insulating film, a lower protective film, and a thinned photosensitive resin film. The source driver mounting region 25 and the gate driver mounting region are also collectively referred to as a "driver circuit mounting region."

<1.3 Position of Unused Output Terminal Section in Source Driver>

Figure 11A:
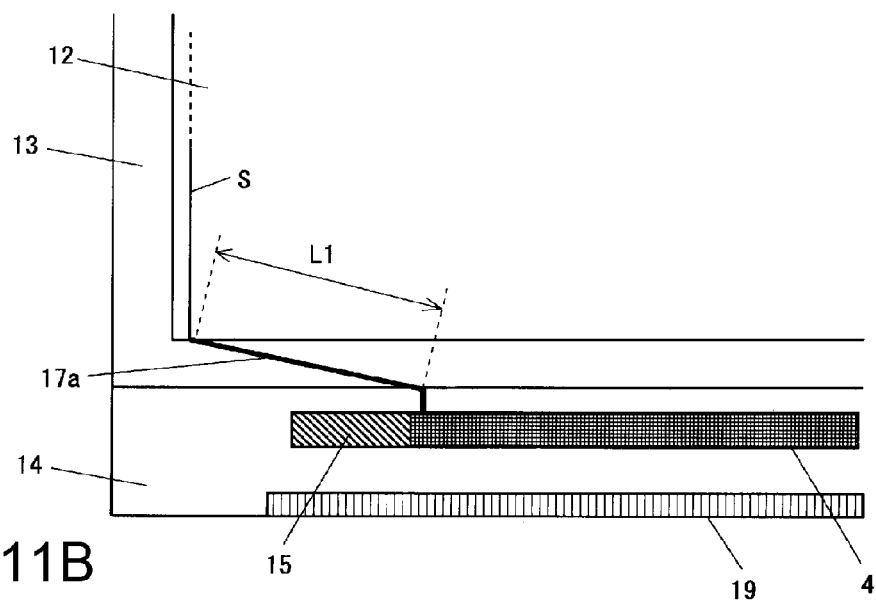
FIG. 11A is a drawing that shows a source lead-out line when the unused output terminal section is provided on the left edge of the source driver.

An optimal position for the unused output terminal section 15 in the source driver 4 will be described. FIG. 11A shows a source lead-out line 17a when the unused output terminal section 15 is provided on the left edge of the source driver 4. As shown in FIG. 11A, the unused output terminal section 15 is provided on the left edge of the source driver 4, and thus, the output bump of the source driver 4 closest to the source signal line S formed on the left edge of the display region 12 is the output bump to the immediate right of the unused output terminal section 15. In this case, the source signal line S and the source driver 4 are connected to each other through the source lead-out line 17a extending from the output bump that is to the immediate right of the unused output terminal section 15.

Figure 11B:
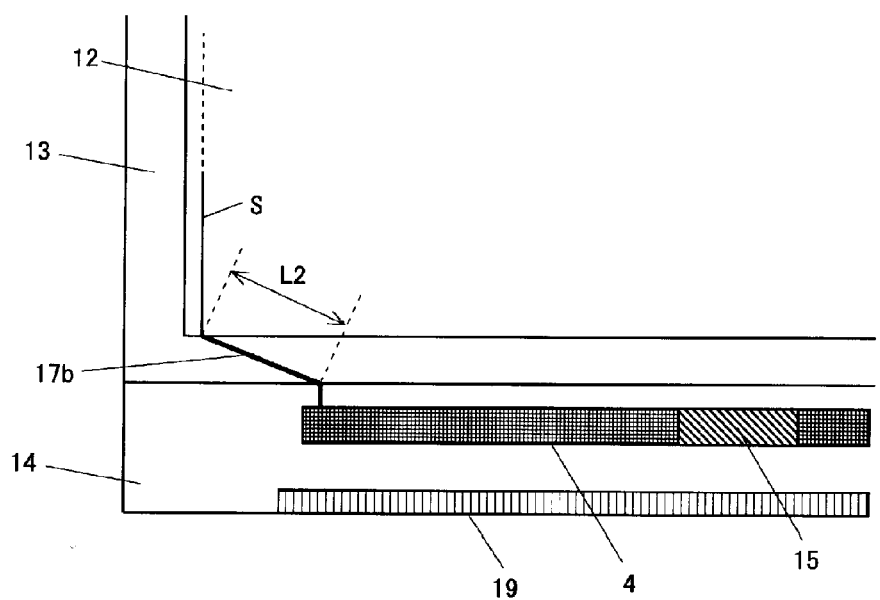
FIG. 11B is a drawing that shows a source lead-out line when the unused output terminal section is formed in a position to the right of the left edge of the source driver.

FIG. 11B is a drawing that shows a source lead-out line 17b when the unused output terminal section 15 is formed in a position that is to the right of the left edge of the source driver 4. As shown in FIG. 11B, the unused output terminal section 15 is formed in a position that is to the right of the left edge of the source driver 4, and thus, the output bump of the source driver 4 closest to the source signal line S formed on the left edge of the display region 12 is the output bump on the left edge of the source driver 4. In this case, the source signal line S and the source driver 4 are connected to each other by the source lead-out line 17b extending from the left edge output bump.

A length L1 of the source lead-out line 17a shown in FIG. 11A and a length L2 of the source lead-out line 17b shown in FIG. 11B will be compared. The length L2 of the source lead-out line 17b is shorter than the length L1 of the source lead-out line 17a. Thus, it is possible to make the length of the source lead-out line 17 shorter when the unused output terminal section 15 is provided to the right of the left edge than when the unused output terminal section 15 is provided on the left edge of the source driver 4. In this manner, it is possible to widen the pitch between the source lead-out lines 17, and thus, it is possible to reduce defects due to short-circuiting resulting from source lead-out lines 17 coming into contact with each other. In addition, by shortening the length of the source lead-out lines 17, it is possible to reduce the probability of disconnections occurring in the source lead-out lines 17. The right edge of the source driver 4 is similar, and thus, it is preferable that the unused output terminal section 15 be provided in the center of the source driver 4. The source lead-out lines 17 and gate lead-out lines 18 to be described later are sometimes collectively referred to as "lead-out lines."

<1.4 Effects>

According to the present embodiment, the open region 28 is provided in the source driver mounting region 25 corresponding to the unused output terminal section 15 where the unused output bumps of the source driver 4 are gathered. By forming the common signal line 30 in the open region 28, it is possible to form the common transfer electrode 20a in the portion of the frame region 13 directly over the open region 28 in addition to forming the common transfer electrodes 20 respectively in the lower left and lower right corners of the frame region 13. In this manner, variation in common signal lag for each position on the common electrode 24 is mitigated, and thus, it is possible to reduce display unevenness in the image.

It is possible to ensure a wide open region 28 in the source driver mounting region 25 within the width of the unused output terminal section 15. As a result, the resistance of the common signal line 30 and the load thereon decrease, reducing the occurrence of shadowing in the image.

By disposing the unused output terminal section 15 of the source driver 4 in a position away from either edge of the source driver 4, it is possible to shorten the length of the source lead-out lines 17 connecting the output terminals 26 of the source mounting region 25 to the source signal lines S formed on both sides of the display region 12. Thus, the pitch between the source lead-out lines 17 is widened, and therefore, it is possible to reduce defects due to short-circuiting resulting from source lead-out lines 17 coming into contact with each other. Also, it is possible to reduce the probability of disconnections occurring in the source lead-out lines 17.

It is possible to determine the positions and number of common transfer electrodes 20a formed in the frame region 13 based on the positions and number of the unused output terminal sections 15 disposed in the source driver 4, and thus, it is possible to prevent a decrease in display quality of an image displayed in the large screen and high resolution liquid crystal display device 1.

The surface of the common signal line 30 is protected by the semiconductor film 34, and thus, the common signal line 30 is not removed entirely or thinned out due to being etched in steps that follow. As a result, it is possible to prevent the common signal line 30 from becoming non-conductive or from having a high resistance, and thus, it is possible to prevent lag in the common signal and to prevent a high load on the common signal line 30. Thus, by reducing the occurrence of display unevenness of the image and the occurrence of shadowing, it is possible to prevent a decrease in display quality. The semiconductor film 34 is formed in the same step as the channel regions of the TFTs 7, and thus, it is possible to simplify the manufacturing process of the liquid crystal display device 1.

<1.5 Liquid Crystal Display Devices to which the Present Embodiment is Applicable By changing the position and number of unused output terminal sections 15 provided in the source driver 4, it is possible to change the configuration of the TFT substrate 10. Various types of TFT substrates that are applicable to the liquid crystal display device 1 of the present embodiment will be described below.

<1.5.1 Application Example 1>

Figure 12:
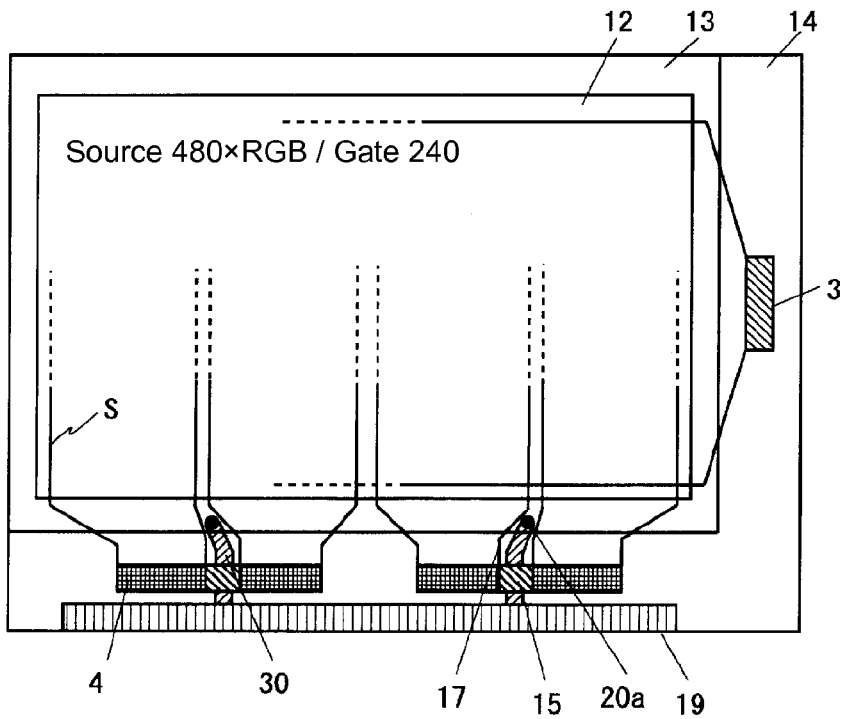
FIG. 12 is a drawing that shows a configuration in which the TFT substrate has two source drivers with the unused output terminal sections disposed in the centers thereof.
Figure 13:
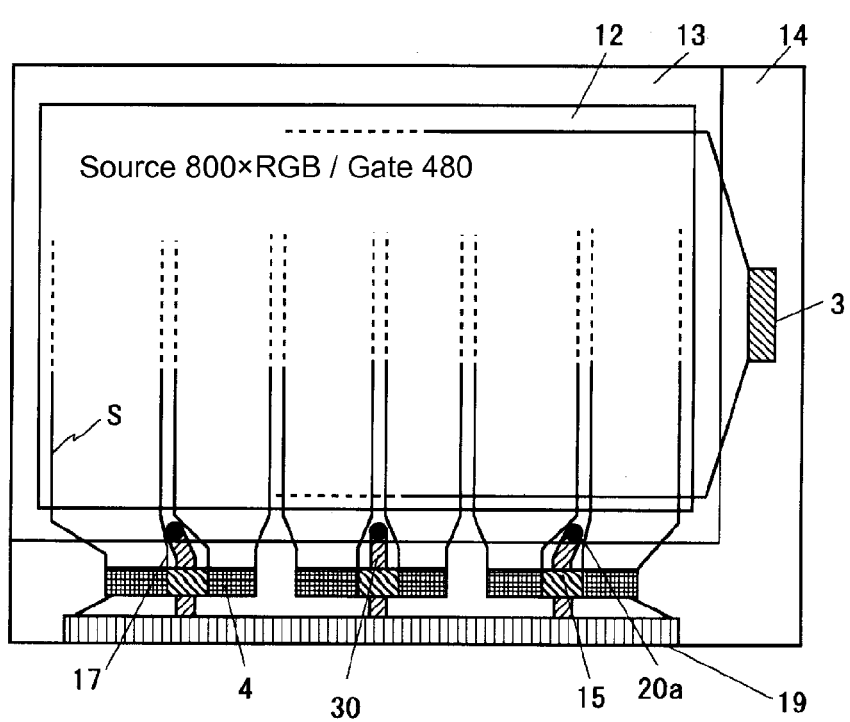
FIG. 13 is a drawing that shows a configuration in which the TFT substrate has three source drivers with the unused output terminal sections disposed in the centers thereof.

Application Example 1 is a TFT substrate in which an unused output terminal section is disposed in the center of each of a plurality of source drivers 4. FIG. 12 is a drawing that shows a configuration of a TFT substrate 51 provided with two source drivers 4 in which unused output terminal sections 15 are provided in the respective centers thereof. FIG. 13 is a drawing that shows a configuration of a TFT substrate 52 provided with three source drivers 4 in which unused output terminal sections 15 are provided in the respective centers thereof.

In the TFT substrate 51 shown in FIG. 12, source drivers 4 with a total of 960 output bumps per source driver 4 run in a mode in which 720 output bumps are operated in order to drive source signal lines S of which there are 480 for each color RGB (a total of 1440). Thus, it is necessary to mount two source drivers 4 in the element region 14 on the bottom edge. The unused output terminal section 15 where 240 unused output bumps of the source driver 4 are gathered is disposed in the center of each source driver 4. Open regions (not shown in drawings) are provided in positions in the source driver mounting region (not shown in drawings) corresponding to the unused output terminal sections 15. Next, common signal lines 30 connecting the common transfer electrodes 20a to the FPC connecting region 19 are formed through the open regions. In this manner, it is possible to widen the pitch between the source lead-out lines 17, and thus, it is possible to reduce defects due to short-circuiting resulting from source lead-out lines 17 coming into contact with each other.

In the TFT substrate 52 shown in FIG. 13, source drivers 4 with a total of 960 output bumps per source driver 4 run in a mode in which 800 output bumps are operated in order to drive source signal lines of which there are 800 for each color RGB (a total of 2400). Thus, it is necessary to mount three source drivers 4 in the element region 14 on the bottom edge. The unused output terminal section 15 where 160 unused output bumps of the source driver 4 are gathered is disposed in the center of each source driver 4. Open regions (not shown in drawings) are provided in positions in the source driver mounting region (not shown in drawings) corresponding to the unused output terminal sections 15. Next, common signal lines 30 connecting the common transfer electrodes 20a to the FPC connecting region 19 are formed through the open regions. Thus, similar to the TFT substrate 51 shown in FIG. 12, it is possible to reduce the occurrence of defects due to short-circuiting caused by source lead-out lines 17 coming into contact with each other.

Thus, by mounting a plurality of source drivers 4, each having a total of 960 output bumps, for example, it is possible to reduce the occurrence of display unevenness and shadowing in a wider range of resolutions. Also, as in the TFT substrates 51 and 52, unused output terminal sections 15 where unused output bumps are gathered are provided in the respective source drivers 4, and thus, it is possible to have the same source driver 4 be used for liquid crystal display devices 1 of differing resolutions.

<1.5.2 Application Example 2>

Figure 14:
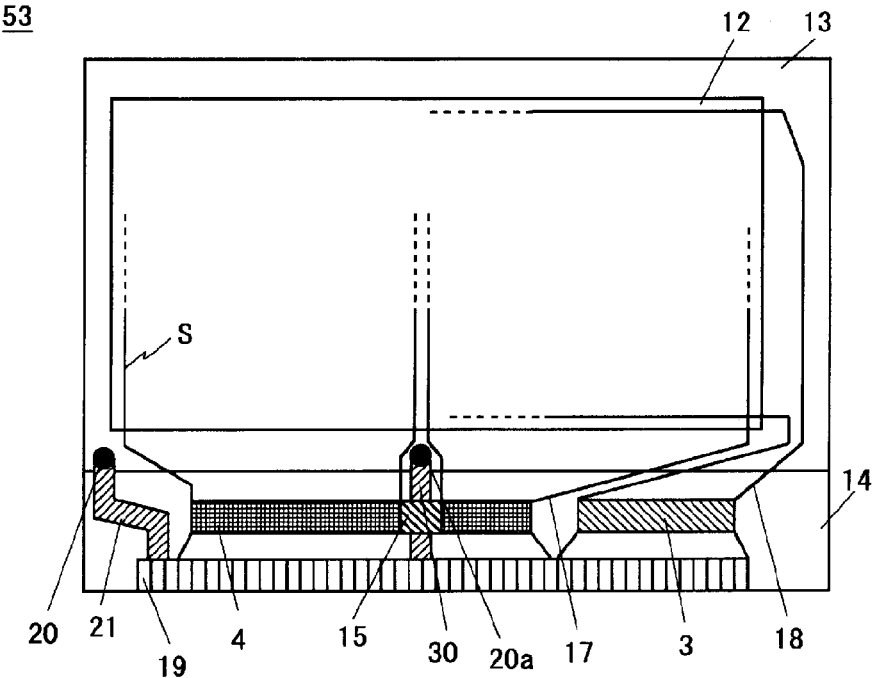
FIG. 14 is a drawing that shows a configuration in which the TFT substrate has the source driver and gate driver disposed in a row in the element region.

Application Example 2 is a TFT substrate in which the unused output terminal section is disposed away from the center of the source driver 4. FIG. 14 is a drawing that shows a configuration of a TFT substrate 53 in which a source driver 4 and a gate driver 3 are disposed in a row in an element region 14. As shown in FIG. 14, the source driver 4 and the gate driver 3 are disposed in one row in the element region 14 on the bottom edge with a prescribed gap therebetween. A common transfer electrode 20 is disposed in the lower left corner of a frame region 13. A common signal line 21 extending from the FPC connecting region 19 is connected to the common transfer electrode 20. However, gate lead-out lines 18 extending from the gate driver 3 are concentrated in the lower right corner of the frame region 13, and thus, it is difficult to dispose a common transfer electrode 20 in the lower right corner.

Specifically, there are approximately 100 to 2400 gate lead-out lines 18 with a width of approximately 3 to 10 μm, and a gap therebetween of approximately 3 to 10 μm in the lower right corner of the frame region 13. On the other hand, when taking into consideration the alignment margin and variation in the resistance, in order to sufficiently reduce the resistance of the common transfer electrode 20, it is necessary to make the size thereof 800 μm$^2$. Thus, it is difficult to dispose a common transfer electrode 20 of that size in the lower right corner where the gate lead-out lines 18 are concentrated.

However, the unused output terminal section 15 is provided to the right of the center of the source driver 4. Next, an open region (not shown in drawings) is provided in a position in the source driver mounting region (not shown in drawings) corresponding to the unused output terminal section 15. A common signal line 30 connecting the common transfer electrode 20a to the FPC connecting region 19 is formed through the open region formed below the unused output terminal section 15. By disposing the unused output terminal section 15 to the right of the center of the source driver 4 in this manner, it is possible to dispose the common transfer electrode 20a in the center of the frame region 13. The source signal lines S are connected to the source driver 4 through the source lead-out lines 17.

Figure 15:
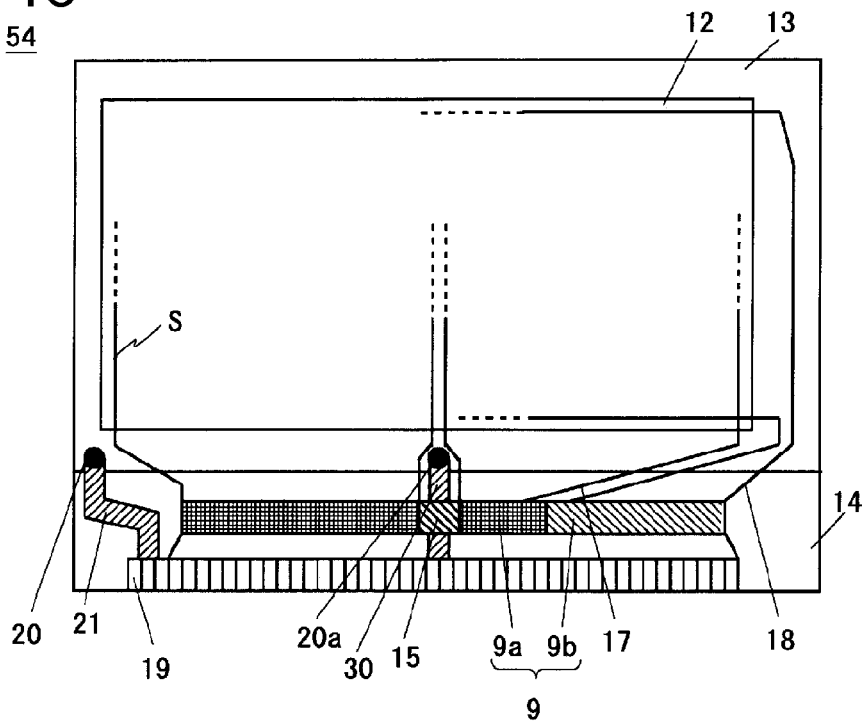
FIG. 15 is a drawing that shows a configuration of a TFT substrate in which a one chip driver is mounted in the element region.

FIG. 15 is a drawing that shows a configuration of a TFT substrate 54 in which a one-chip driver 9 is mounted in an element region 14. As shown in FIG. 15, a driver 9 (hereinafter referred to as a "one-chip driver 9") is mounted in a mounting region (hereinafter referred to as a "driver mounting region") (not shown in drawings), a source signal output part 9a and a gate signal output part 9b being provided as one chip constituting the driver 9, the mounting region integrally constituting a region where the source signal output part 9a is mounted and a region where the gate signal output part 9b is mounted. In the one-chip driver 9, the left side is the source signal output part 9a, and the right side is the gate signal output part 9b. In this case also, it is difficult to provide a large common transfer electrode 20 in the lower right corner of the frame region 13 where gate lead-out lines 18 are concentrated. However, as in the TFT substrate 53 shown in FIG. 14, it is possible to dispose the common transfer electrode 20a in the center of the frame region 13 by disposing the unused output terminal section 15 in a region to the right of the center of the source signal output part 9a, or in other words, the center of the one-chip driver 9.

By disposing the unused output terminal section 15 of the source driver 4 or the source signal output part 9a to the right or the left of the center thereof in this manner, it is possible to dispose the common transfer electrode 20a in a desired position in the frame region 13.

<1.5.3 Application Example 3>

In Application Examples 1 and 2, a control signal was applied to the gate signal lines G from only the right side of the frame region 13. By contrast, in Application Example 3, a control signal is applied to the gate signal lines G from not only the right side but also the left side of the frame region 13.

Figure 16:
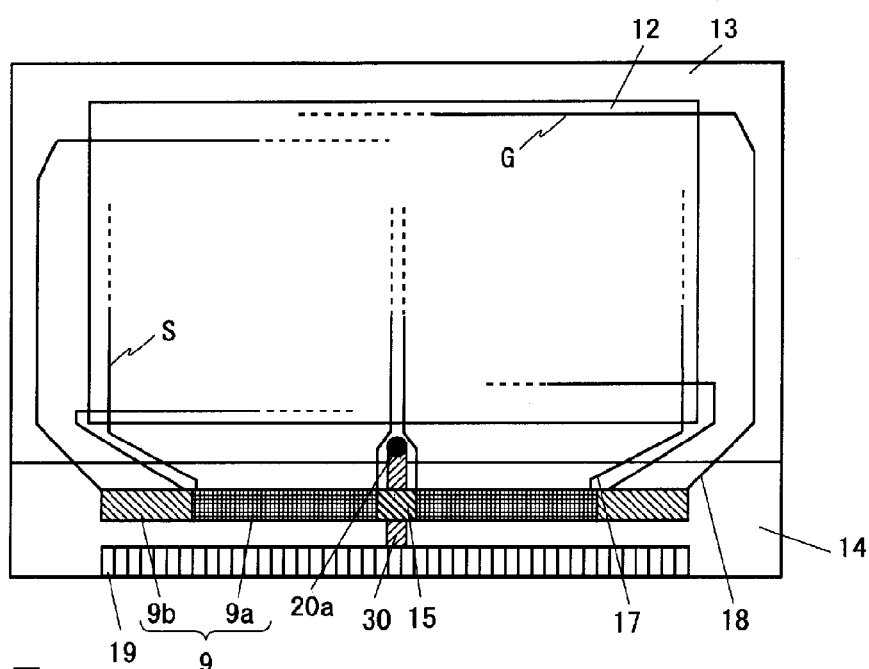
FIG. 16 is a drawing that shows a configuration of a TFT substrate in which gate lead-out lines extending from the one chip driver are connected to gate signal lines in the left and right of the frame region.

FIG. 16 is a drawing that shows a configuration of a TFT substrate 55 in which gate lead-out lines 18 extending from a one-chip driver 9 are connected to the gate signal lines G at the left and right sides of the frame region 13. As shown in FIG. 16, the one-chip driver 9 mounted in the element region 14 on the bottom edge is constituted of gate signal output parts 9b on the left and right portions thereof, and a source signal output part 9a interposed therebetween. Thus, the gate lead-out lines 18 connected to the gate signal lines G on the left side of the frame region 13 extend from the left side gate signal output part 9b, and the gate lead-out lines 18 connected to the gate signal lines G on the right side of the frame region 13 extend from the right side gate signal output part 9b. Thus, the lower right and lower left corners of the frame region 13 respectively have the gate lead-out lines 18 concentrated therein, as in the TFT substrate 54 shown in FIG. 15. It is difficult to dispose a large common transfer electrode 20 in such corners where the gate lead-out lines 18 are concentrated.

An unused output terminal section 15 is disposed in the center of the one-chip driver 9, or in other words, the center of the source signal output part 9a. An open region (not shown in drawings) is provided in a position corresponding to the unused output terminal section 15 of the region where the source signal output part 9a is mounted (not shown in drawings). A common signal line 30 connecting the common transfer electrode 20a, which is disposed in the center of the frame region 13, to the FPC connecting region 19 is formed through the open region. By disposing the unused output terminal section 15 in the center of the one-chip driver 9 in this manner, it is possible to dispose the common transfer electrode 20a in the center of the frame region 13 instead of disposing the common transfer electrode 20 in the left and right corners of the frame region 13, and to supply a common signal to the common transfer electrode 20a. The source signal lines S are connected to the source driver 4 through the source lead-out lines 17.

Figure 17:
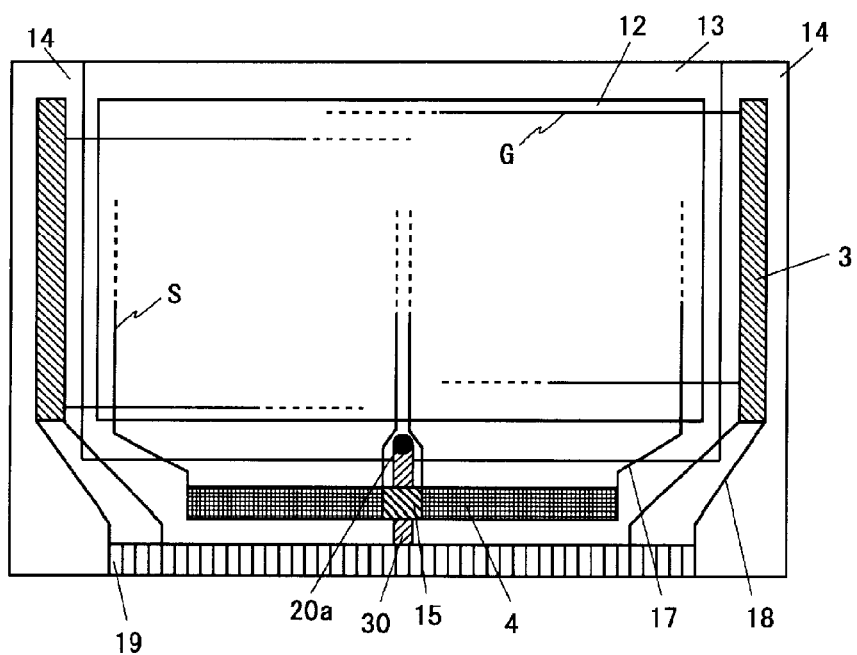
FIG. 17 is a drawing that shows a configuration of a TFT substrate in which gate drivers are respectively mounted in the left and right of the element region.

FIG. 17 is a drawing that shows a configuration of a TFT substrate 56 in which gate drivers 3 are respectively mounted in left and right portions of an element region 14. As shown in FIG. 17, a source driver 4 is mounted in the element region 14 on the bottom edge, and the gate drivers 3 are respectively mounted in the left and right portions of the element region 14. The left side gate driver 3 is supplied a control signal from FPC connecting terminals on the left side of the FPC connecting region 19 through gate lead-out lines 18, and the right side gate driver 3 is supplied a control signal from FPC connecting terminals on the right side of the FPC connecting region 19 through gate lead-out lines 18. In this case also, as in the TFT substrate 55 shown in FIG. 16, gate lead-out lines 18 are concentrated in the lower left and lower right corners of the frame region 13, and thus, it is difficult to dispose a large common transfer electrode 20 in these corners. By disposing an unused output terminal section 15 in the center of the source driver 4, an open region (not shown in drawings) is provided in a position corresponding to the unused output terminal section 15. A common signal line 30 connecting the common transfer electrode 20a, which is disposed in the center of the frame region 13, to the FPC connecting region 19 is formed through the open region. With this configuration, it is possible to supply a common signal to the common transfer electrode 20a disposed in the center of the frame region 13. The source signal lines S are connected to the source driver 4 through the source lead-out lines 17.

Even if the gate lead-out lines 18 are concentrated in the lower right and lower left corners of the frame region 13 in this manner, it is possible to dispose the common transfer electrode 20a in the center of the frame region 13. The configuration of the one-chip driver 9 shown in FIG. 16 and the configuration of the source driver 4 and the gate drivers 3 shown in FIG. 17 are particularly effective in a liquid crystal display device 1 with a narrow frame region 13.

The gate signal output parts 9b shown in FIG. 16 and the gate drivers 3 shown in FIG. 17 input control signals from the left side and right side of the frame region 13 alternately, for each gate signal line G. However, the gate signal output parts 9b and the gate drivers 3 may input control signals from the left side and the right side of the frame region 13 simultaneously for the same gate signal line G. Such a driving method for the gate signal line G is effective as a method to mitigate lag in the control signal if the load on the gate signal line G is large, such as in a liquid crystal display device 1 with a large display or a liquid crystal display device 1 that displays images at a high resolution.

<1.5.4 Application Example 4>

Figure 18:
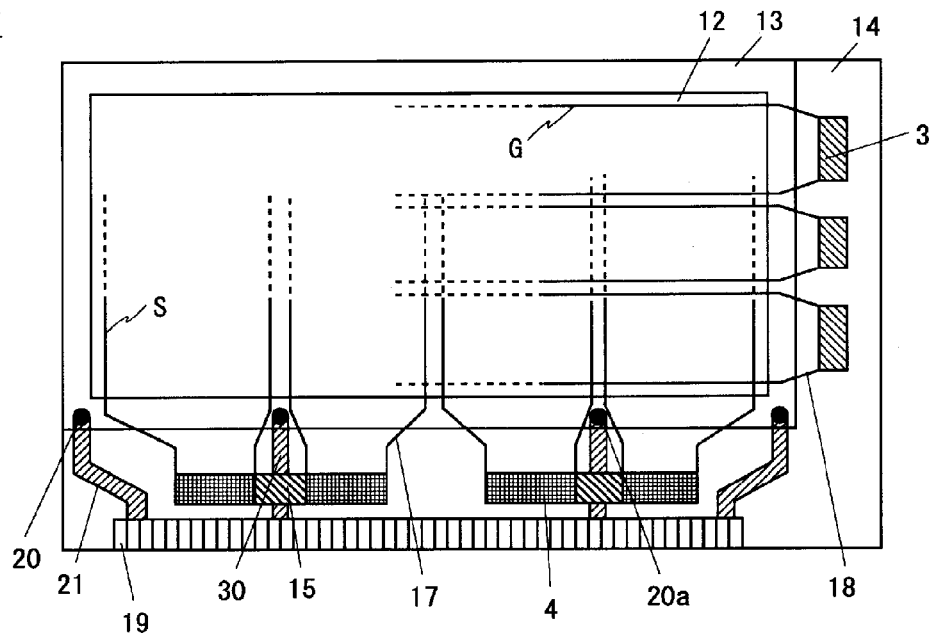
FIG. 18 is a drawing that shows a configuration of a TFT substrate in which two source drivers are mounted in the element region on the bottom edge.

Application Example 4 is a TFT substrate in which a plurality of source drivers 4 are mounted. FIG. 18 is a drawing that shows a configuration of a TFT substrate 57 in which two source drivers 4 are mounted in an element region 14 on the bottom edge. As shown in FIG. 18, the two source drivers 4 are disposed parallel to the display region 12, and in one row. An unused output terminal section 15 is provided in the center of each source driver 4. Thus, not only are common transfer electrodes 20 disposed in the lower right and lower left corners of the frame region 13, but common transfer electrodes 20a are disposed in the frame region 13, directly over the respective unused output terminal sections 15. The common transfer electrodes 20 are connected to the FPC connecting region 19 through common signal lines 21, and the common transfer electrodes 20a are connected to the FPC connecting region 19 through common signal lines 30. With this configuration, it is possible to increase the number of common transfer electrodes 20a in a high resolution display device with a large display that requires a plurality of source drivers 4. Thus, it is possible to mitigate variation in lag in the common signal for each position on the common electrode 24, reducing the occurrence of display unevenness. As a result, it is possible to improve the quality of the image displayed in the liquid crystal panel 2. The source signal lines S are connected to the source drivers 4 through the source lead-out lines 17. The gate signal lines G are connected to three gate drivers 3 disposed in the element region 14 on the right side through the gate lead-out lines 18.

Figure 19:
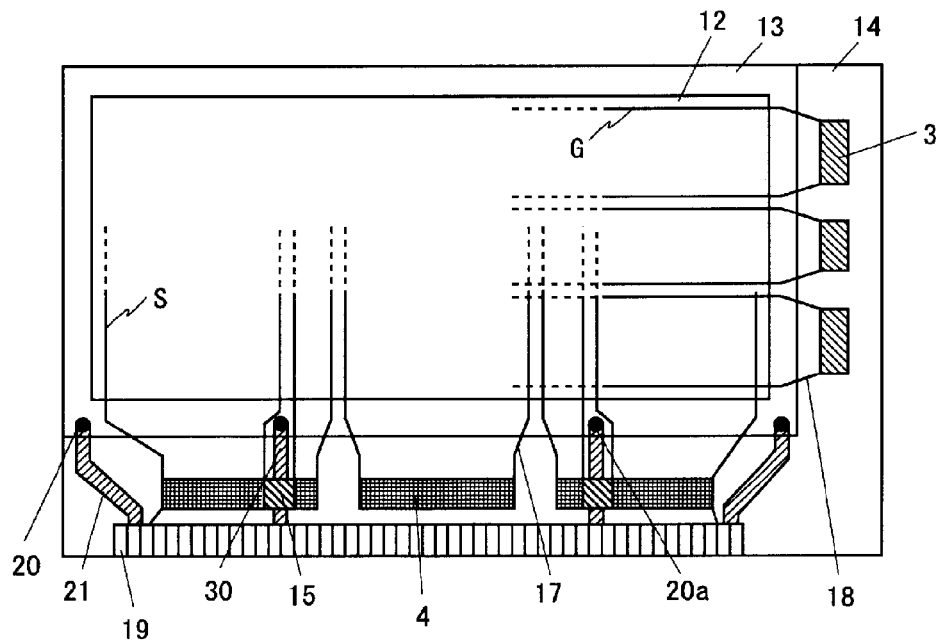
FIG. 19 is a drawing that shows a configuration of a TFT substrate in which three source drivers are mounted in the element region on the bottom edge.

FIG. 19 is a drawing that shows a configuration of a TFT substrate 58 in which three source drivers 4 are mounted in the element region 14 on the bottom edge. As shown in FIG. 19, the three source drivers 4 are disposed parallel to the display region 12, and in one row. Of the three source drivers 4, the source drivers 4 on both sides are respectively provided with unused output terminal sections 15. In the left side source driver 4, the unused output terminal section 15 is provided in a position to the right of center, and in the right side source driver 4, the unused output terminal section 15 is provided to the left of center. However, the center source driver 4 is not provided with an unused output terminal section 15. Thus, similar to the TFT substrate 57 shown in FIG. 18, not only are common transfer electrodes 20 disposed in the lower right and lower left corners of the frame region 13, but common transfer electrodes 20a are also disposed in the frame region 13 directly over the unused output terminal sections 15 in the left and right source drivers 4. With this configuration, it is possible to increase the number of common transfer electrodes 20a, and thus, it is possible to display a high quality image by reducing display unevenness in the image. The source signal lines S are connected to the source drivers 4 through the source lead-out lines 17. The gate signal lines G are connected to three gate drivers 3 disposed in the element region 14 on the right side through the gate lead-out lines 18.

The source driver 4 in the center of the TFT substrate 58 shown in FIG. 19 was not provided with an unused output terminal section. However, an unused output terminal section may also be provided in the center source driver 4. Alternatively, the unused output terminal section may be provided in specific source drivers 4 instead of in each source driver 4.

<2. Embodiment 2>

Figure 20:
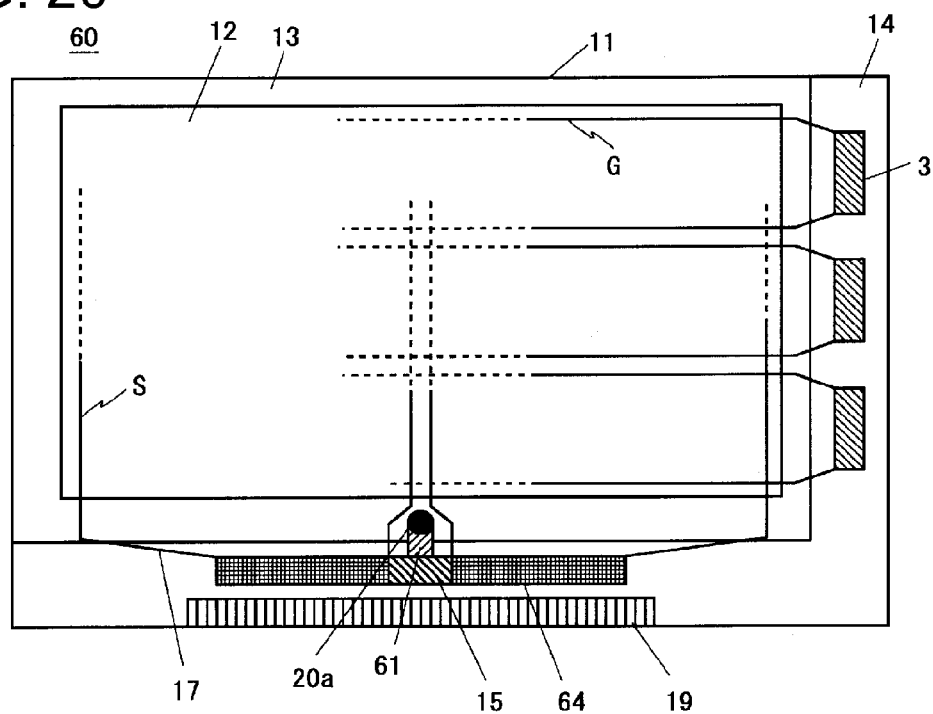
FIG. 20 is a drawing that shows a configuration of a TFT substrate included in a liquid crystal display device according to Embodiment 2 of the present invention.
Figure 21:
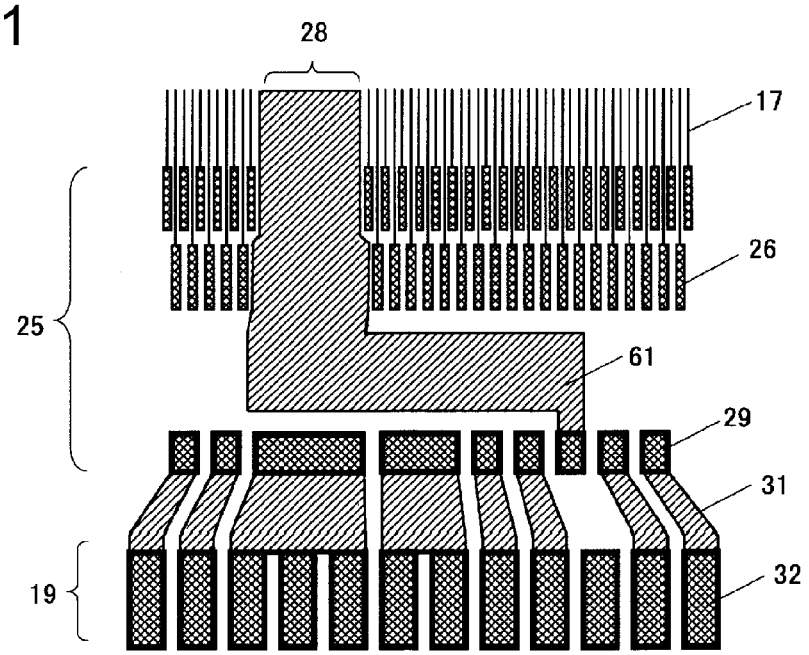
FIG. 21 is a magnified view of the vicinity of a source driver mounting region of the TFT substrate shown in FIG. 20.

FIG. 20 is a drawing that shows a configuration of a TFT substrate 60 included in a liquid crystal display device 1 according to Embodiment 2 of the present invention. FIG. 21 is a magnified view of the vicinity of a source driver mounting region 25 of the TFT substrate 60 shown in FIG. 20. The configuration of the liquid crystal display device 1 of the present embodiment and the method of forming the source driver mounting region 25 are both the same as those of Embodiment 1, and therefore, descriptions thereof are omitted. Also, components that are the same as the components of the TFT substrate of Embodiment 1, or corresponding components thereof, are assigned the same reference characters with descriptions thereof omitted.

As shown in FIG. 2, in the TFT substrate 10 of Embodiment 1, the common signal was applied to the common signal lines 21 and 30 from an external source through the FPC substrate, but in the TFT substrate 60 of the present embodiment, the common signal is generated within the source driver 64 and supplied to a common transfer electrode 20a. In order to do so, it is necessary to design the layout of the source driver 64 so as to not only generate a signal voltage corresponding to a digital image signal, but to also generate a common signal, and to output the generated common signal from the input bumps.

As shown in FIGS. 20 and 21, a common signal line 61 that connects the input terminal 29, to which the generated common signal is outputted, to the common transfer electrode 20a provided in the frame region 13 is formed through a region between the input terminals 29 and the output terminals 26 of the source driver mounting region 25, and an open region 28 corresponding to the unused output terminal section 15. A circuit that generates the common signal may also be included in the gate drivers 3. The circuit that generates the common signal is also referred to as the "common signal generating circuit."

In the present embodiment, the common signal is outputted to the common signal line 61 from the input terminal 29 and not through the FPC substrate, and thus, it is possible to mitigate lag in the common signal. As a result, the load on the common signal line 61 is reduced, and thus, it is possible to reduce shadowing and to prevent a decrease in display quality of the image.

<3. Embodiment 3>

Figure 22:
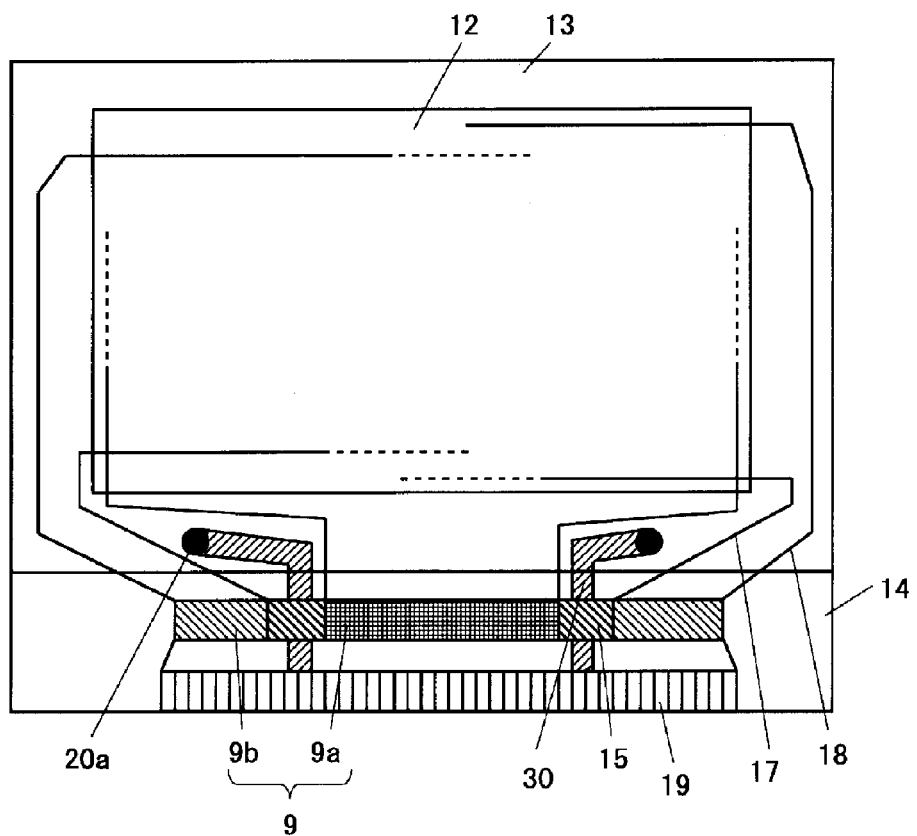
FIG. 22 is a drawing that shows a configuration of a TFT substrate included in a liquid crystal display device according to Embodiment 3 of the present invention.
Figure 23:
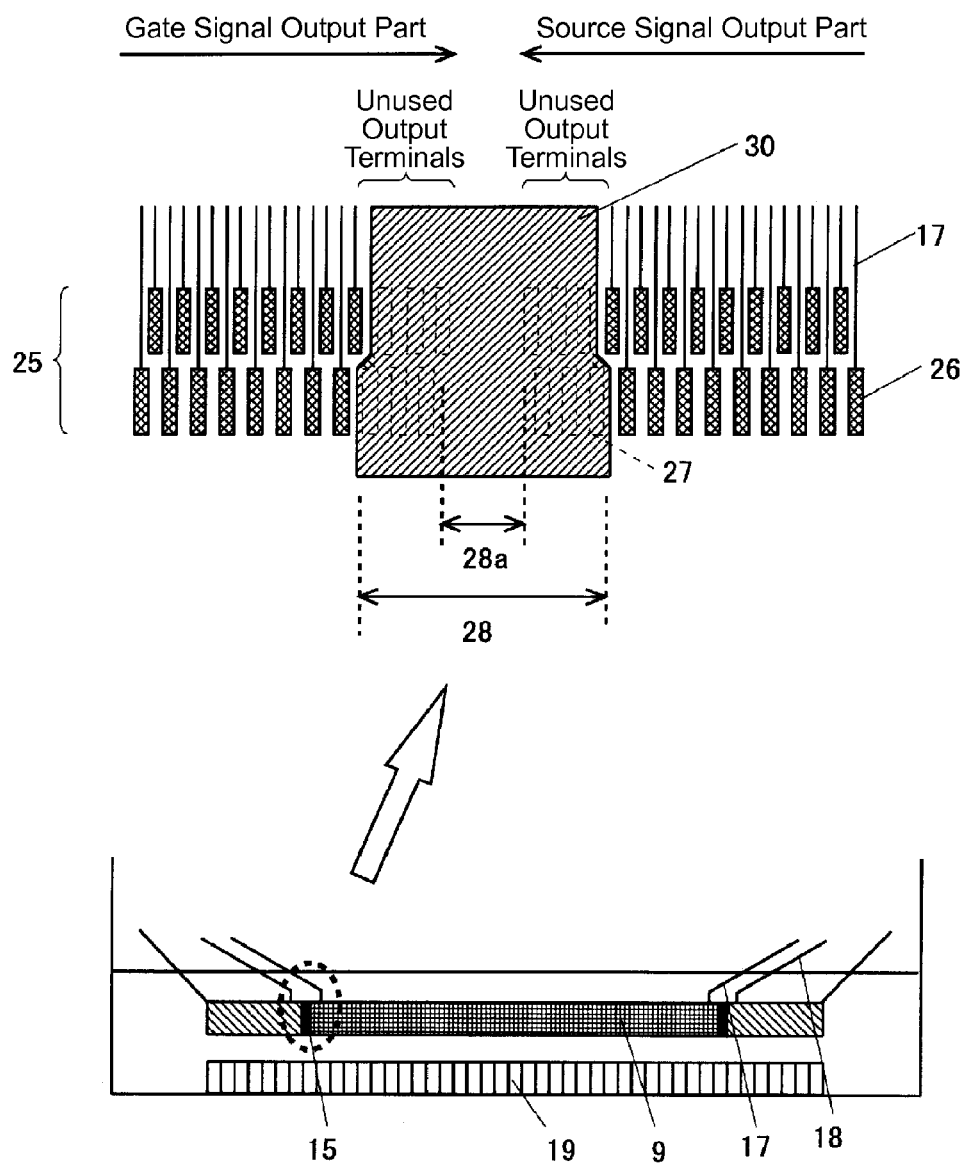
FIG. 23 is a magnified view of the vicinity of a driver mounting region of the TFT substrate shown in FIG. 22.

FIG. 22 is a drawing that shows a configuration of a TFT substrate 70 included in a liquid crystal display device 1 according to Embodiment 3 of the present invention. FIG. 23 is a magnified view of the vicinity of a driver mounting region 25 of the TFT substrate 70 shown in FIG. 22. The configuration of the liquid crystal display device 1 of the present embodiment and the method of forming the driver mounting region 25 are both the same as those of Embodiment 1, and therefore, descriptions thereof are omitted. Also, components that are the same as the components of the TFT substrate 10 of Embodiment 1, or corresponding components thereof, are assigned the same reference characters with descriptions thereof omitted.

As shown in FIG. 22, in an element region 14 of the TFT substrate, a one-chip driver 9 is mounted, the one-chip driver 9 being constituted of a source signal output part 9a, and gate signal output parts 9b that sandwich the source signal output part 9a from the left and right sides thereof. Unused output terminal sections 15 are respectively provided in the boundaries between the left and right gate signal output parts 9b and the source signal output part 9a. Common signal lines 30 that connect the FPC connecting region 19 to the common transfer electrodes 20a formed in the frame region 13 are formed through open regions (not shown in drawings) corresponding to the unused output terminal sections 15 of the driver mounting region (not shown in drawings).

Next, a method for forming the unused output terminal sections 15 in the boundaries between the gate signal output parts 9b and the source signal output part 9a will be described. As shown in FIG. 23, the layout of the one-chip driver 9 is designed such that, in the driver mounting region 25 where the one-chip driver 9 is mounted, if the open region 28a in the boundary between the region where the gate signal output part is mounted and the region where the source signal output part is mounted is narrow, then the unused output bumps in the gate signal output part 9b and the source signal output part are gathered on the left and the right of the open region 28a. With this configuration, output terminals 27 corresponding to the unused output bumps are not necessary, thus allowing the unused output terminal section 15 to be widened. Thus, the open region 28a of the driver mounting region 25 corresponding to the unused output terminal section 15 is widened, thus becoming a wide open region 28.

By forming a common signal line 30 in the wide open region 28 formed in this manner, it is possible to widen the common signal line 30. With this configuration, in addition to preventing lag in the common signal, the load on the common signal line 30 can be reduced, and thus, it is possible to reduce shadowing and to prevent a decrease in display quality of the image.

<4. Embodiment 4>

Figure 24:
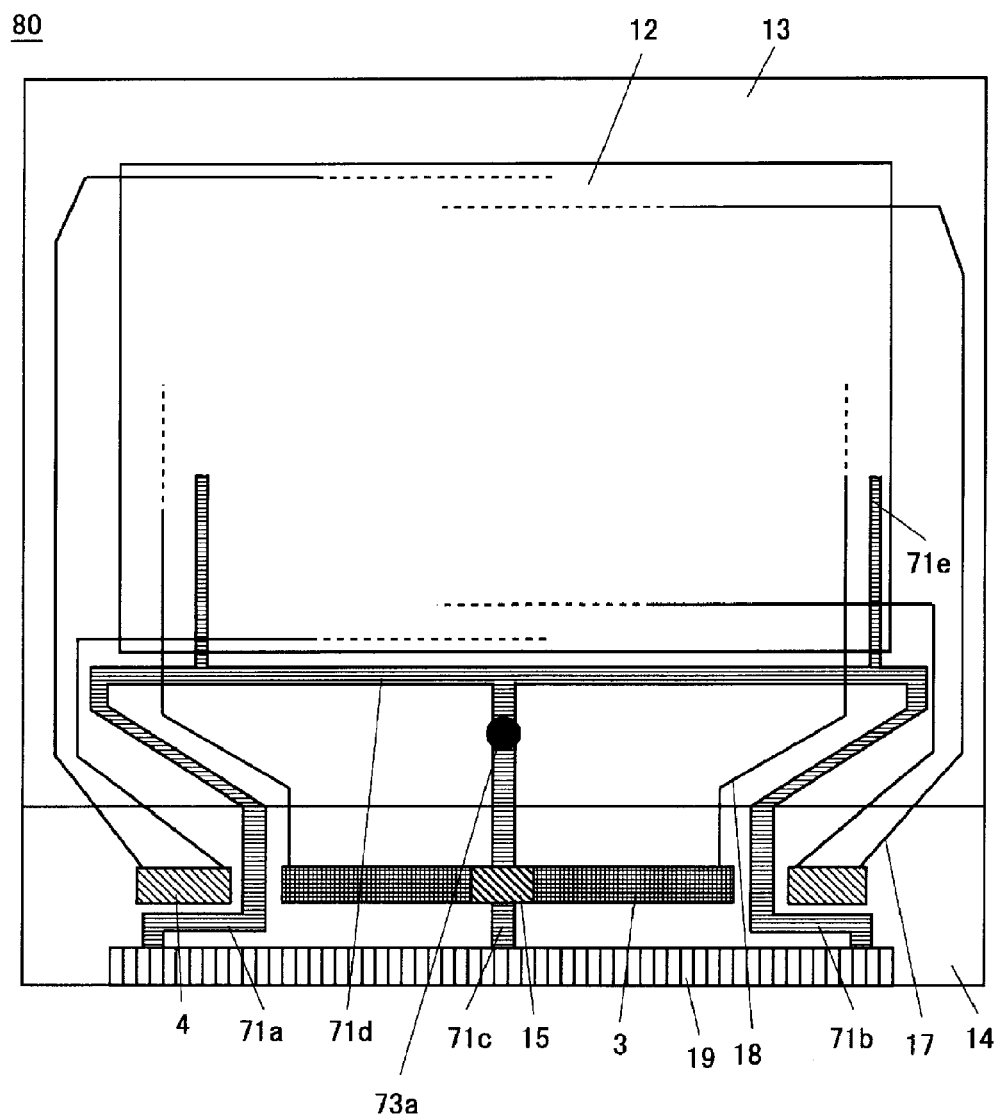
FIG. 24 is a drawing that shows a configuration of a TFT substrate included in a liquid crystal display device according to Embodiment 4 of the present invention.

FIG. 24 is a drawing that shows a configuration of a TFT substrate 80 included in a liquid crystal display device 1 according to Embodiment 4 of the present invention. Of the components of the TFT substrate 80 of the present embodiment, components that are the same as the components of the TFT substrate 10 of Embodiment 1, or corresponding components thereof, are assigned the same reference characters with descriptions thereof omitted.

As shown in FIG. 24, an element region 14 of the TFT substrate 80 has a gate driver 3, and two source drivers 4 on the left and the right of the gate driver 3 with prescribed gaps therebetween. An unused output terminal section 15 is provided in the center of the gate driver 3. An open region (not shown in drawings) is formed in a position in a gate driver mounting region (not shown in drawings), corresponding to the unused output terminal section 15. Three auxiliary capacitance lines 71a to 71c having one end connected to an FPC connecting terminal (not shown in drawings) of an FPC connecting region 19 are formed on such a TFT substrate 80. The auxiliary capacitance lines 71a and 71b extend to the frame region 13 through the respective spaces between the gate driver 3 and the source drivers 4. The auxiliary capacitance line 71c extends to the frame region 13 through the open region in the gate driver mounting region. An auxiliary capacitance line 71d that is parallel to a display region 12 is formed in the frame region 13, and the auxiliary capacitance lines 71a to 71c are respectively connected to both edges and the center of the auxiliary capacitance line 71d. Also, auxiliary capacitance lines 71e branching off of the auxiliary capacitance line 71d are formed for each column of pixels in order to apply an auxiliary signal to each pixel (not shown in drawings) in the display region 12.

A configuration that additionally has an auxiliary capacitance line 71c in the open region in the gate driver mounting region in this manner can have a smaller lag in auxiliary signal supplied to the auxiliary capacitance line 71d compared to a configuration that only has the auxiliary capacitance lines 71a and 71b. Thus, it is possible to stabilize the size of the auxiliary capacitance provided parallel to the liquid crystal capacitance of each pixel. Thus, shadowing, flickering, and the like are mitigated, and therefore, it is possible to prevent a decrease in display quality of the image.

The auxiliary signal supplied to the auxiliary capacitance lines 71a to 71c can also be used as a common signal, and thus, the auxiliary capacitance line 71c may also have the function of the common signal line. In such a case, if the common transfer electrode 73a is formed connected with the auxiliary capacitance line 71c, there is no need to provide a common signal line in addition to the auxiliary capacitance lines 71a to 71c. In FIG. 24, the common transfer electrode 73a is provided on the auxiliary capacitance line 71c, but may be provided on the auxiliary capacitance line 71a or 71b.

In the present embodiment, the auxiliary capacitance line 71c is additionally provided in the open region in the gate driver mounting region, and thus, it is possible to reduce the load on the auxiliary capacitance line 71c. Also, the auxiliary capacitance line 71c is additionally used as a common signal line, and thus, the pitch of the source lead-out lines 17 or the gate lead-out lines 18 can be widened. As a result, it is possible to reduce defects due to short-circuiting in the source lead-out lines 17 or the gate lead-out lines 18.

In the TFT substrate 80 of the present embodiment, the gate driver 3 and the source drivers 4 are mounted, but a one-chip driver may be mounted instead of the gate driver 3 and the source drivers 4. Also, in the present embodiment, one unused output terminal section 15 was disposed in the center of the gate driver 3, but the position and number of the unused output terminal sections 15 is not limited thereto.

<5. Embodiment 5>

Figure 25:
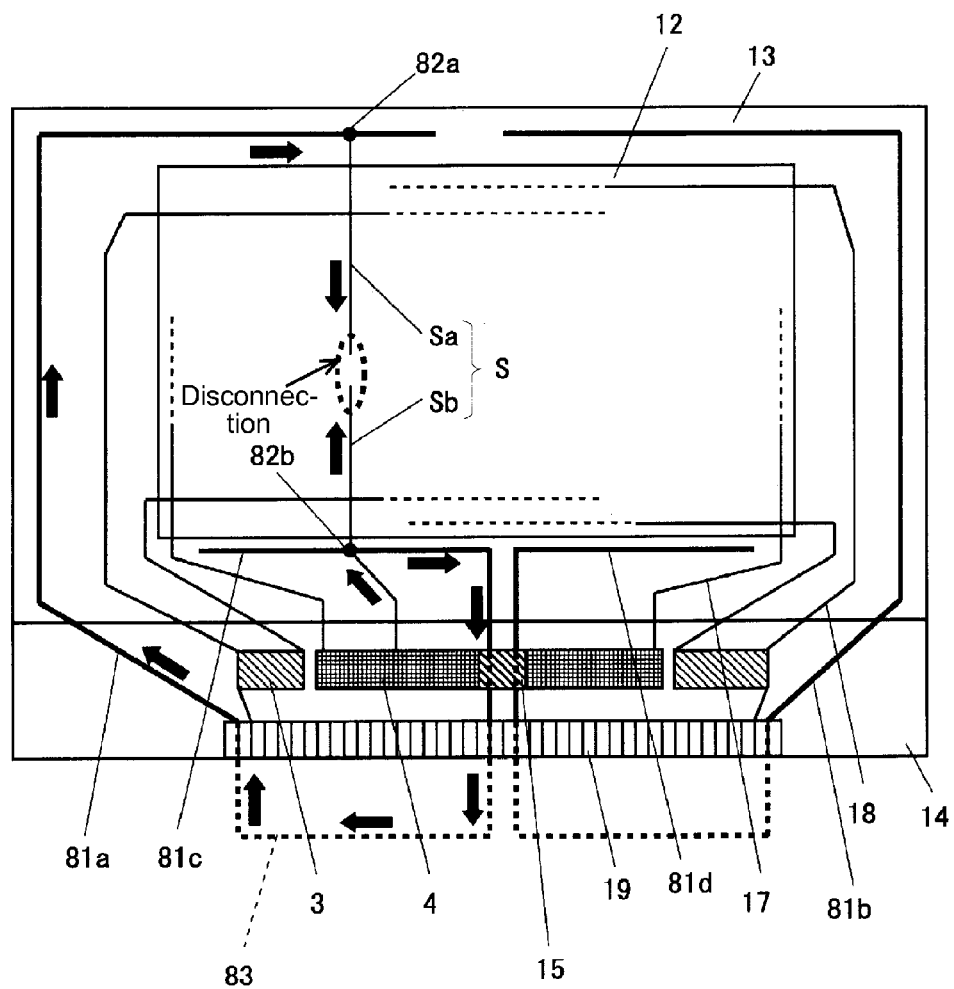
FIG. 25 is a drawing that shows a configuration of a TFT substrate included in a liquid crystal display device according to Embodiment 5 of the present invention.

FIG. 25 is a drawing that shows a configuration of a TFT substrate 90 included in a liquid crystal display device 1 according to Embodiment 5 of the present invention. Of the components of the TFT substrate 90 of the present embodiment, components that are the same as the components of the TFT substrate 10 of Embodiment 1, or corresponding components thereof, are assigned the same reference characters with descriptions thereof omitted.

As shown in FIG. 25, an element region 14 on the bottom edge of the TFT substrate 90 has a source driver 4, and two gate drivers 3 on the left and the right of the source driver 4 with a prescribed gap therebetween. An unused output terminal section 15 is provided in the center of the source driver 4, and an open region (not shown in drawings) is formed in a position of a source driver mounting region (not shown in drawings) corresponding to the unused output terminal section 15. In the TFT substrate 90, a repair wiring line 81a that extends from the left edge of the FPC connecting region 19 to the vicinity of the upper center of the frame region 13 through the left side of the frame region 13, and a repair wiring line 81b that extends from the right edge of the FPC connecting region 19 to the vicinity of the upper center of the frame region 13 through the right side of the frame region 13 are formed.

On the lower side of the frame region 13, a repair wiring line 81c that extends along the display region 12 from the left edge thereof to the center, and a repair wiring line 81d that extends along the display region 12 from the right edge thereof to the center are formed. The repair wiring lines 81c and 81d are further connected to an FPC connecting terminal (not shown in drawings) of the FPC connecting region 19 through an open region below the unused output terminal section 15 of the source driver 4. In the frame region 13 on the upper side, the repair wiring lines 81a and 81b intersect with the respective upper ends of the source signal lines S, while being insulated from the source signal lines S with an insulating film (not shown in drawings). In the lower side of the frame region 13, the repair wiring lines 81c and 81d respectively intersect with the bottom ends of the source signal lines S while being insulated therefrom with an insulating film. The repair wiring lines 81a and 81c, and the repair wiring lines 81b and 81d are respectively connected through repair wiring lines 83 of an FPC substrate or a circuit board connected to the TFT substrate 90.

In such a TFT substrate 90, as shown in FIG. 25, if there is a disconnection in the source signal lines S, no signal voltage is applied above where the source signal line S has a disconnection. A laser beam having a prescribed energy is radiated on intersection points 82a and 82b where the disconnected source signal line S intersects respectively with the repair wiring line 81a and the repair wiring line 81c, which breaks the insulating film insulating the source signal line S from the repair wiring lines 81a and 81c, and melts the metal constituting the source signal line S and the repair wiring lines 81a and 81c. As a result, the upper end of the disconnected source signal line S is connected to the repair wiring line 81a, and the lower end of the disconnected source signal line S is connected to the repair wiring line 81c. In other words, the upper source signal line S (hereinafter referred to as the "source signal line Sa") is connected to the repair wiring line 81a at the intersection point 82a. The lower source signal line S (hereinafter referred to as the "source signal line Sb") is connected to the repair wiring line 81c at the intersection point 82b. As a result, the signal voltage outputted from the source driver 4 is applied to the pixels connected to the source signal line Sb through the source lead-out line 17 and the source signal line Sb. On the other hand, the signal voltage outputted from the source driver 4 to the pixels connected to the source signal line Sa is applied through the path shown with the arrows in FIG. 25. In other words, the signal voltage outputted from the source driver 4 is applied to the pixels in the order of the source lead-out line 17, the intersection point 82b, the repair wiring line 81c, the repair wiring line 83, the repair wiring line 81a, the intersection point 82a, and the source signal line Sa. In this manner, it is possible to apply a signal voltage to all pixels connected to the source signal lines Sa and Sb. As a result, it is possible to fix line defects due to disconnections in the source signal lines S, and it is possible to prevent a decrease in display quality of the image such as display unevenness occurring due to lag in the signal supplied to the repaired source signal line S. This increases the yield of the liquid crystal display device 1 and reduces the manufacturing cost.

In the TFT substrate 90 of the present embodiment, the disconnected signal line was designated as the source signal line S, but it is possible to similarly apply this technique even in a case in which the disconnected signal line is the gate signal line G. Also, the gate drivers 3 and the source driver 4 are mounted, but a one-chip driver may be mounted instead of the gate drivers 3 and the source driver 4. The disconnected source signal line S may be repaired using a repair wiring line that connects the repair wiring lines 81a and 81b, and a repair wiring line that connects the repair wiring lines 81c and 81d. Also, the unused output terminal section 15 of the source driver 4 may be widened, thus allowing a common signal line to be passed through the open region in addition to the repair wiring lines 81c and 81d. In such a case, a common transfer electrode can be disposed in the frame region 13 directly over the open region.

The repair wiring lines 81c and 81d may be connected to source signal lines that are not disconnected instead of to source signal lines S that are disconnected. In this manner, it is possible to confirm from outside whether or not a prescribed signal is outputted from the source driver 4 to the pixels, through the FPC substrate. The repair wiring lines 81a to 81d are referred to as "first wiring lines," and of these, the repair wiring lines 81a and 81b are sometimes referred to as "second wiring lines" and the repair wiring lines 81c and 81d are sometimes referred to as "third wiring lines."

<6. Other Embodiments>

A display device to which the present invention is applicable is not limited to the liquid crystal display device 1, and simply needs to be a display device that has pixel electrodes and a common electrode, or electrodes with the same functions thereof. The present invention can be applied to a microcapsule-type electrophoretic electronic paper, for example.

<7. Modification Examples Common to All Embodiments>

The embodiments above described cases in which unused output terminal sections 15 are provided mainly in source drivers 4, but the unused output terminal sections may be provided in gate drivers 3. Alternatively, the unused output terminal sections may be provided in both the source drivers 4 and the gate drivers 3.

In the embodiments above, the source driver 4 and the gate driver 3 mounted in the liquid crystal display device 1 were individual semiconductor devices. However, the present invention can be similarly applied to a monolithic driver-type liquid crystal display device 1 in which the source driver 4 and the gate driver 3 are formed on the same substrate as the TFTs of the pixels.

The common signal line 30, the auxiliary capacitance line 71c, and the repair wiring lines 81c and 81d are sometimes collectively referred to as "signal wiring lines." Also, the common signal, the auxiliary signal, and the signal voltage based on the image signal are sometimes collectively referred to as "prescribed signals."

Industrial Applicability

The present invention is suitable for a display device such as an active matrix liquid crystal display device, and particularly to an active matrix liquid crystal display device having wiring lines for supplying a common signal to common transfer electrodes.

DESCRIPTION OF REFERENCE CHARACTERS 1 liquid crystal display device
4 source driver
6 pixel
9 one-chip driver
10, 51 to 58, 60, 70, 80, 90 TFT substrate
12 display region
15 unused output terminal section
17 source lead-out line
19 FPC connecting region
20a, 73a common transfer electrode
25 source driver mounting region (driver mounting region)
26 output terminal
28 open region
30 common signal line
71a to 71e auxiliary capacitance line
81a to 81d repair wiring line

The invention claimed is:

1. A display device, comprising a first substrate and a second substrate facing each other with a display medium layer sandwiched therebetween, the first substrate having a plurality of pixels each having a pixel electrode,
wherein the first substrate includes a plurality of driver circuit mounting regions to mount driving circuits, respectively, a signal wiring line, and connecting terminals at a periphery of the first substrate on which a flexible wiring substrate is to be mounted, each of said plurality of driver circuit mounting regions having a plurality of output terminals in a row so that driving circuits are mounted thereon in a row, said plurality of output terminals in at least one of the plurality of driver circuit mounting regions having an open region that is an area without the output terminals, and
wherein the signal wiring line extents, through said open region, from at least one of the connecting terminals at the periphery of the first substrate to a frame region defining a periphery of a display region of the display device.

2. The display device according to claim 1,
wherein the first substrate further includes a common transfer electrode,
wherein the second substrate further includes a common electrode electrically connected to the common transfer electrode,
wherein the signal wiring line is supplied with a prescribed signal which is a common signal to be supplied to the common electrode, and
wherein the signal wiring line is a common signal line for supplying the common signal to the common electrode through the common transfer electrode.

3. The display device according to claim 1,
wherein the signal wiring line is supplied with a prescribed signal which is an auxiliary signal, and
wherein the signal wiring line is an auxiliary capacitance line that supplies the auxiliary signal to the pixels.

4. The display device according to claim 1, further comprising source signal lines and gate signal lines electrically connected to the pixels, wherein the signal wiring line includes a first wiring line that surrounds the display region, and wherein the first wiring line overlaps at least either of the source signal lines and the gate signal lines, insulated therefrom with an insulating film, in at least one position in a periphery of the display region.

5. A display device, comprising a first substrate and a second substrate facing each other with a display medium layer sandwiched therebetween, the first substrate having a plurality of pixels each having a pixel electrode, wherein the first substrate includes a plurality of driver circuit mounting regions to mount driving circuits, respectively, a signal wiring line, and connecting terminals at a periphery of the first substrate on which a flexible wiring substrate is to be mounted, each of the plurality of driver circuit mounting regions having a plurality of output terminals arranged in a longitudinal direction of a driver circuit so that the driver circuit is mounted thereon in a row, at least one of the plurality of driver circuit mounting regions has an open region that is an area without the output terminals are absent between a first group of output terminals and a second group of output terminals that are adjacent to each other among said plurality of output terminals, and wherein the signal wiring line extents, through said open region, from at least one of the connecting terminals at the periphery of the first substrate to a frame region defining a periphery of a display region of the display device.

6. The display device according to claim 5, wherein the first substrate further includes a common transfer electrode, wherein the second substrate further includes a common electrode electrically connected to the common transfer electrode, wherein the signal wiring line is supplied with a prescribed signal which is a common signal to be supplied to the common electrode, and wherein the signal wiring line is a common signal line for supplying the common signal to the common electrode through the common transfer electrode.

7. The display device according to claim 5, wherein the signal wiring line is supplied with a prescribed signal which is an auxiliary signal, and wherein the signal wiring line is an auxiliary capacitance line that supplies the auxiliary signal to the pixels.

8. The display device according to claim 5, further comprising source signal lines and gate signal lines electrically connected to the pixels, wherein the signal wiring line includes a first wiring line that surrounds the display region, and wherein the first wiring line overlaps at least either of the source signal lines and the gate signal lines, insulated therefrom with an insulating film, in at least one position in a periphery of the display region.

* * * * *